(12) United States Patent
Hon

(10) Patent No.: US 10,076,213 B1
(45) Date of Patent: Sep. 18, 2018

(54) KITCHEN IMPLEMENTS FOR SEPARATING LIPIDS FROM FOOD

(71) Applicant: Raphael Hon, Irvine, CA (US)

(72) Inventor: Raphael Hon, Irvine, CA (US)

( * ) Notice: Subject to any disclaimer, the term of this patent is extended or adjusted under 35 U.S.C. 154(b) by 0 days.

(21) Appl. No.: 15/836,751

(22) Filed: Dec. 8, 2017

Related U.S. Application Data

(60) Provisional application No. 62/535,811, filed on Jul. 21, 2017.

(51) Int. Cl.
*A47J 43/28* (2006.01)

(52) U.S. Cl.
CPC .................................. *A47J 43/285* (2013.01)

(58) Field of Classification Search
CPC ......... A47J 43/20–43/286; B22D 41/00–41/62
USPC ........... 99/495–496; 222/591, 594, 595, 629, 222/604–67
See application file for complete search history.

(56) References Cited

U.S. PATENT DOCUMENTS

| | | |
|---|---|---|
| 2,262,538 A | 11/1941 | Olson et al. |
| 2,572,524 A | 10/1951 | Schmeiler |
| 3,326,384 A | 6/1967 | Wessels |
| D239,812 S | 5/1976 | Gould |
| 4,040,185 A | 8/1977 | Jacobi |
| D268,244 S | 3/1983 | Morin |
| D293,065 S | 12/1987 | Ferm et al. |
| D309,236 S | 7/1990 | Cheng |
| 5,005,294 A | 4/1991 | Roberts et al. |
| 5,077,900 A | 1/1992 | Jamentz |
| 5,084,177 A | 1/1992 | Keene |
| D325,327 S | 4/1992 | Tam et al. |
| 5,199,349 A | 4/1993 | Hansen |
| 5,367,775 A | 11/1994 | Tong et al. |
| D365,255 S | 12/1995 | Huen |
| 5,510,028 A | 4/1996 | Kuhlman |
| 5,526,737 A | 6/1996 | Betzen |
| 5,662,823 A * | 9/1997 | Claar ................... B22D 41/003 222/594 |
| D402,167 S | 12/1998 | Durbin |
| 6,550,146 B1 | 4/2003 | Rouleau |
| D477,972 S | 8/2003 | Schülein |
| D482,579 S | 11/2003 | Kortleven et al. |
| 6,722,043 B2 | 4/2004 | Teng |
| 6,869,531 B2 | 3/2005 | Chiang |
| 7,185,766 B2 | 3/2007 | Cooper |
| D542,103 S | 5/2007 | Yu |
| 7,356,933 B2 | 4/2008 | Wong |

(Continued)

FOREIGN PATENT DOCUMENTS

| | | |
|---|---|---|
| CN | 2659314 Y | 12/2004 |
| CN | 1022583339 A | 11/2011 |

(Continued)

*Primary Examiner* — Michael Laflame, Jr.
(74) *Attorney, Agent, or Firm* — Blair Walker IP Services, LLC

(57) ABSTRACT

A kitchen utensil for removing lipids from food includes a handle having a first end, a second end, and a gripping region between the first end and the second end, a head extending from the second end of the handle, the head having first side, a second side, and an outer perimeter, and wherein the first side includes at least one groove extending inwardly from a first groove end located at the outer perimeter, the at least one groove configured to collect a lipid material therein.

2 Claims, 26 Drawing Sheets

(56) References Cited

U.S. PATENT DOCUMENTS

| | | | |
|---|---|---|---|
| 7,410,577 B2 | 8/2008 | Broje | |
| D627,610 S | 11/2010 | Lee et al. | |
| 7,901,575 B2 | 3/2011 | Reyes | |
| D649,415 S | 11/2011 | Williams | |
| 9,045,875 B2 | 6/2015 | Ozersky et al. | |
| D753,965 S | 4/2016 | Schuler et al. | |
| 2001/0045388 A1 | 11/2001 | Ho | |
| 2005/0045555 A1 | 3/2005 | Taylor | |
| 2005/0127582 A1* | 6/2005 | Richaud ................ | B22D 41/08 266/200 |
| 2011/0067582 A1 | 3/2011 | Reyes | |

FOREIGN PATENT DOCUMENTS

| | | |
|---|---|---|
| CN | 202858707 U | 4/2013 |
| CN | 202959902 U | 6/2013 |
| CN | 202981395 U | 6/2013 |
| CN | 202981723 U | 6/2013 |
| CN | 203016773 U | 6/2013 |
| CN | 103479175 A | 1/2014 |
| CN | 204158270 U | 2/2015 |
| CN | 104905707 A | 9/2015 |
| CN | 205306824 U | 6/2016 |
| CN | 105815987 A | 8/2016 |
| CN | 105902201 A | 8/2016 |
| CN | 105935265 A | 9/2016 |
| JP | 2016016036 A | 2/2016 |
| KR | 20140026211 A | 3/2014 |
| WO | WO2014098499 A1 | 6/2014 |

* cited by examiner

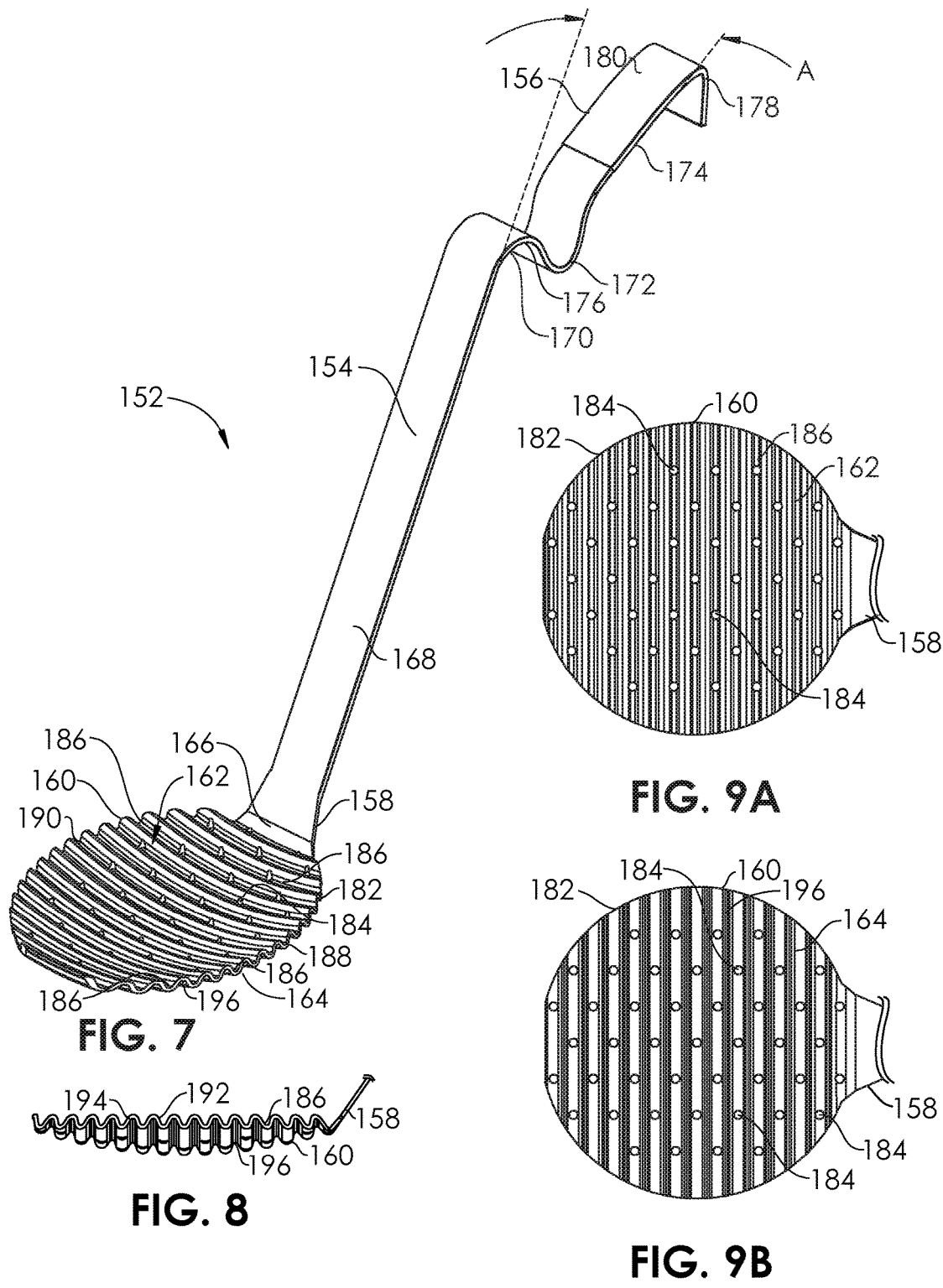

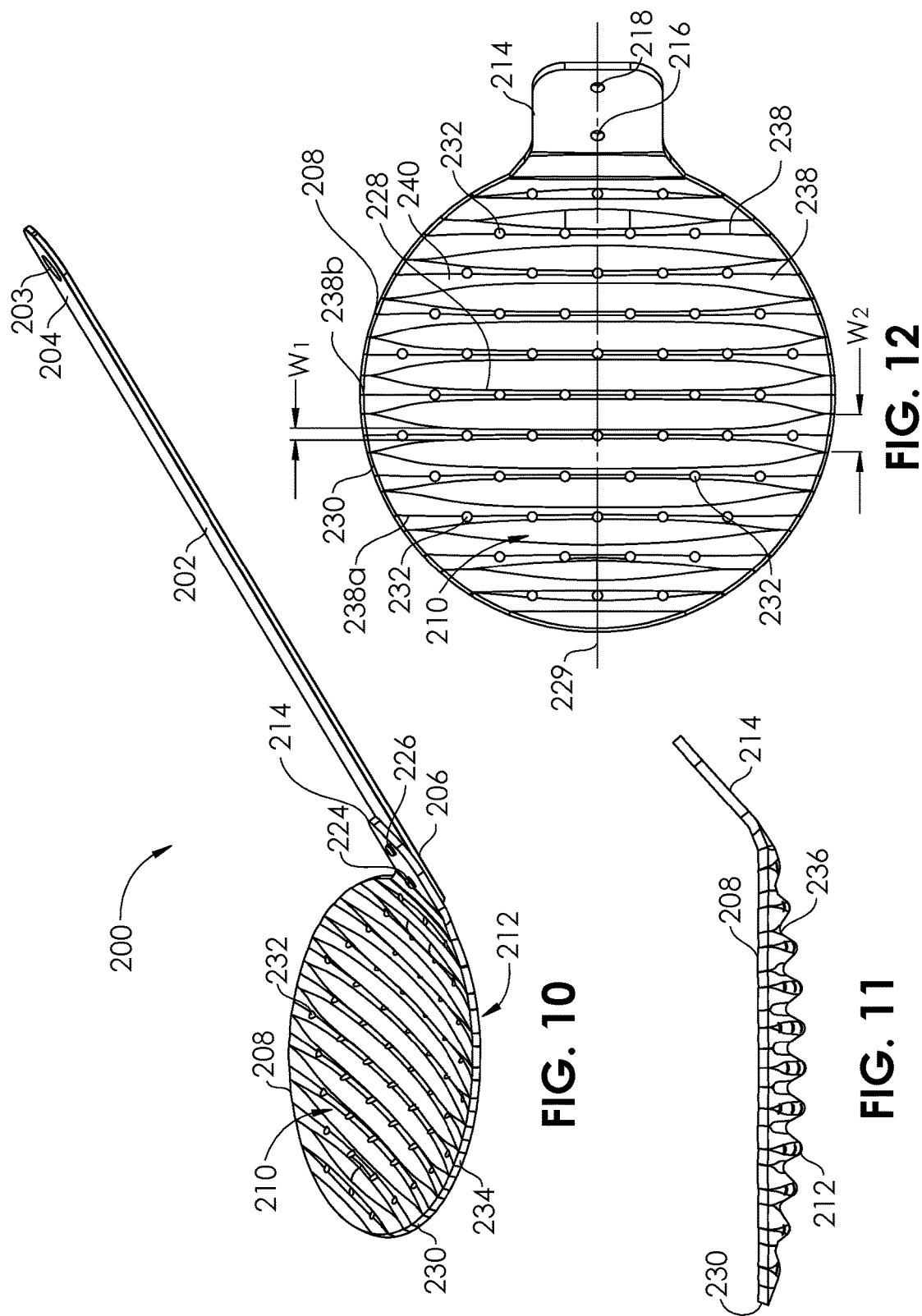

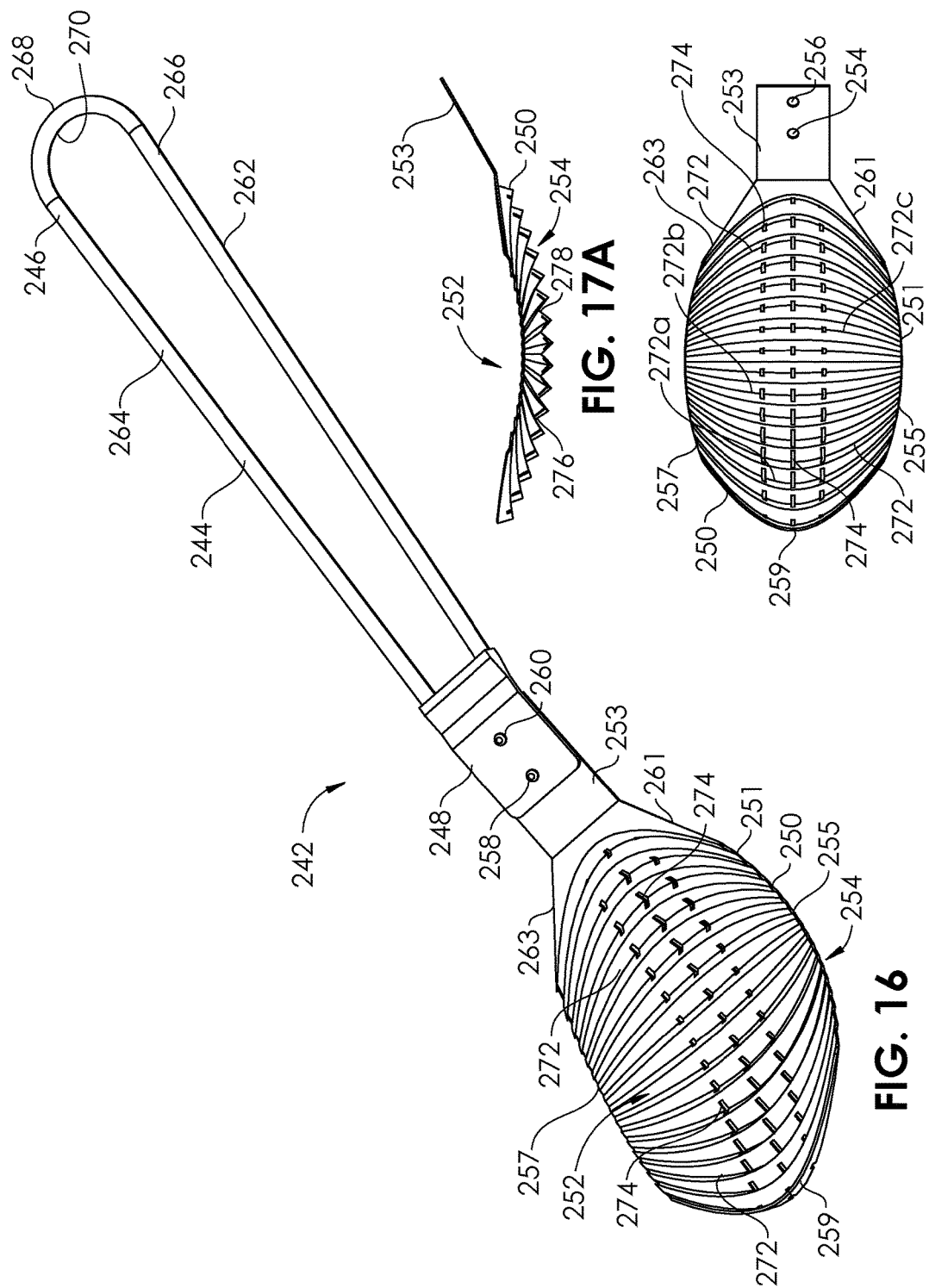

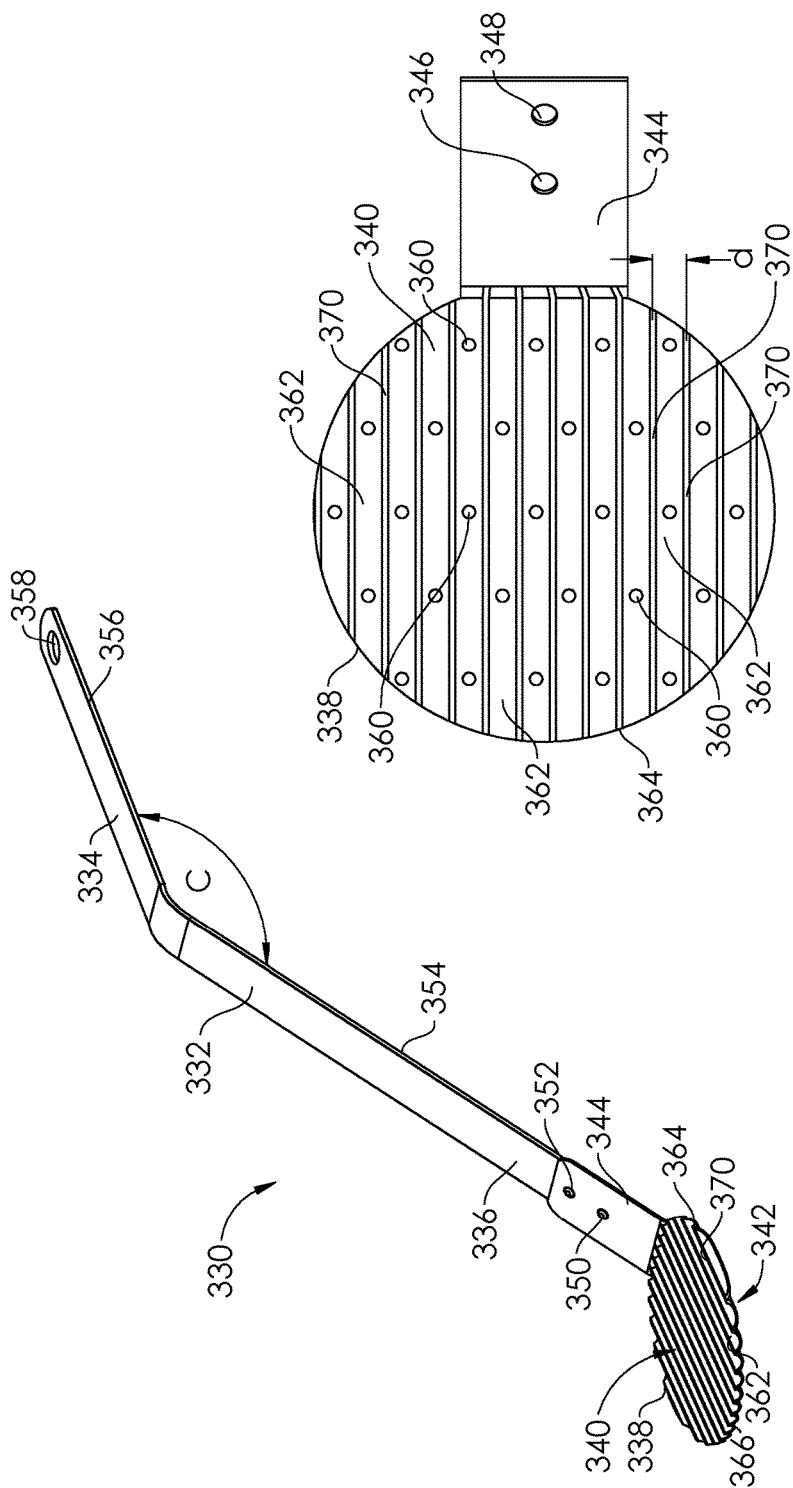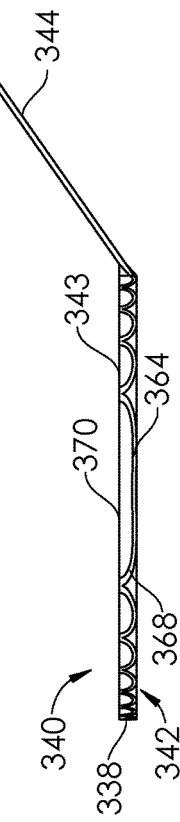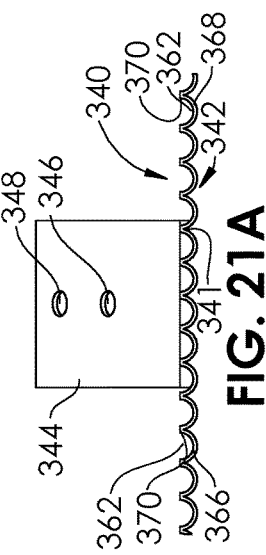

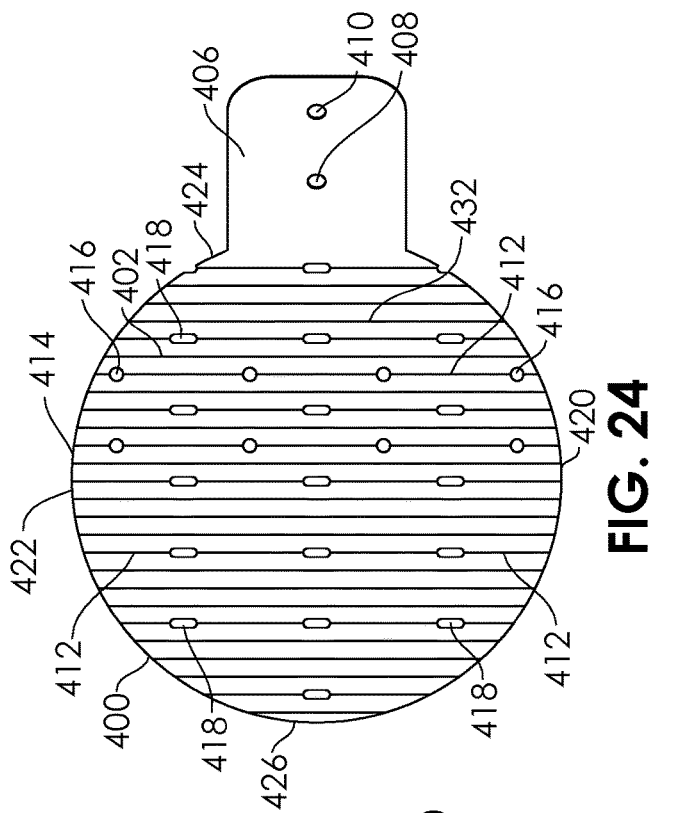
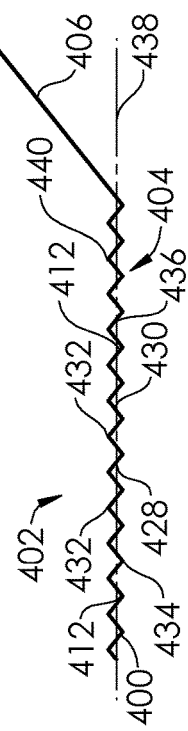
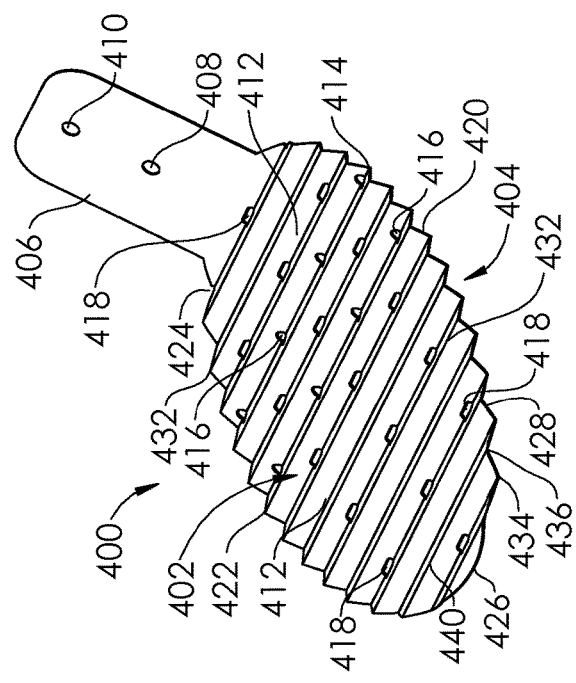
FIG. 24
FIG. 25
FIG. 23

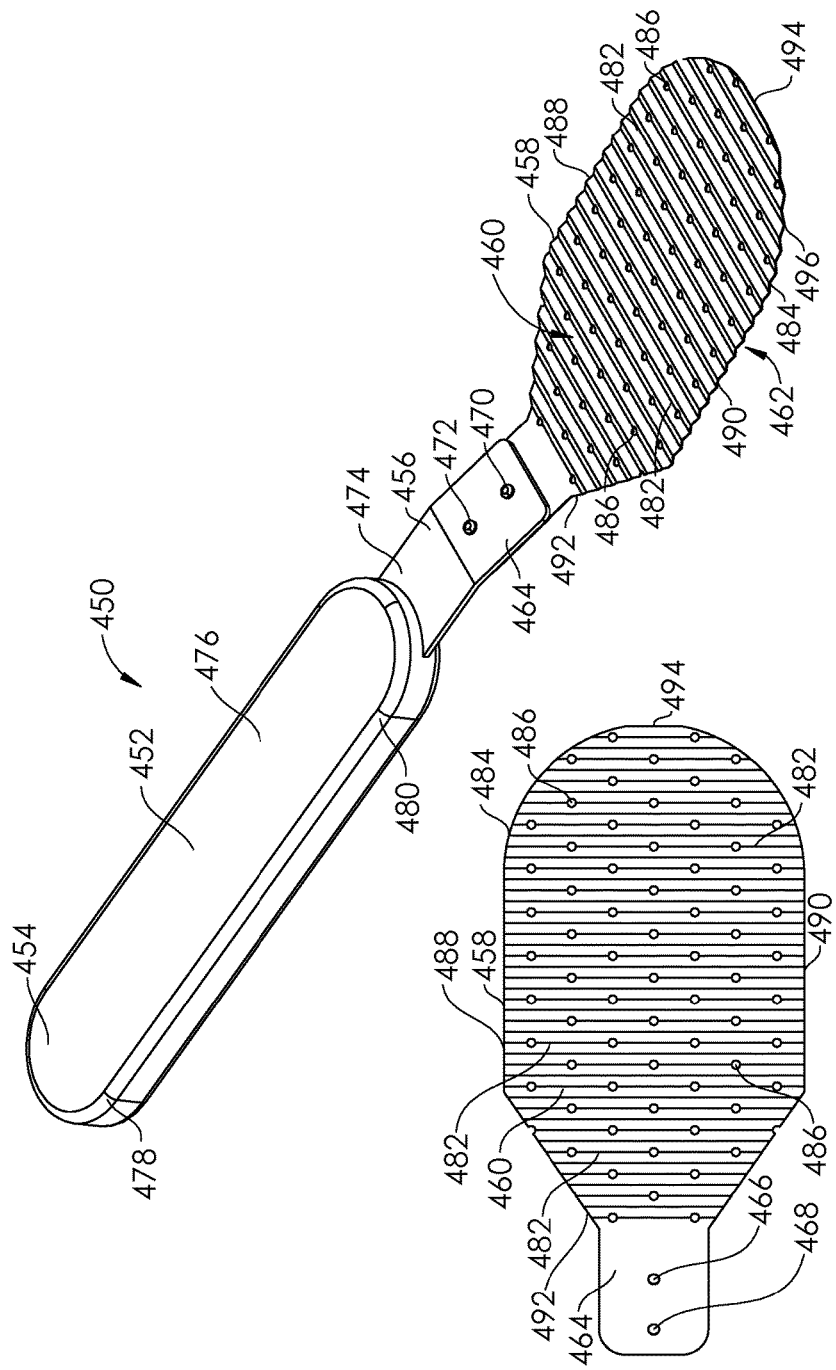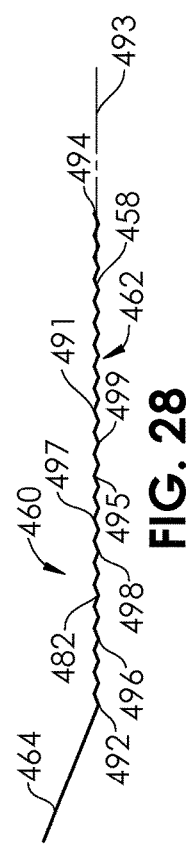

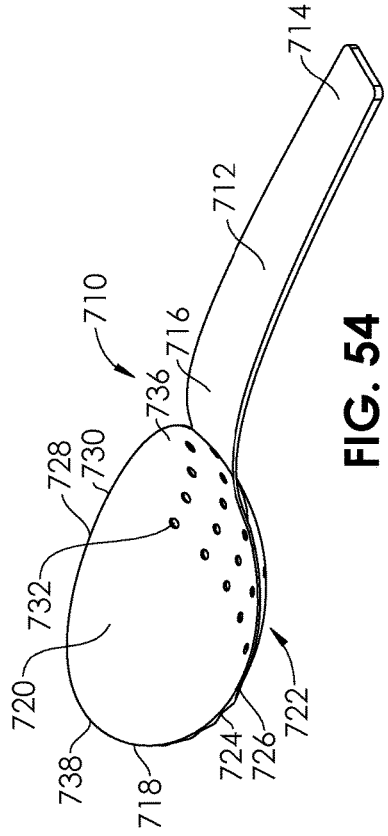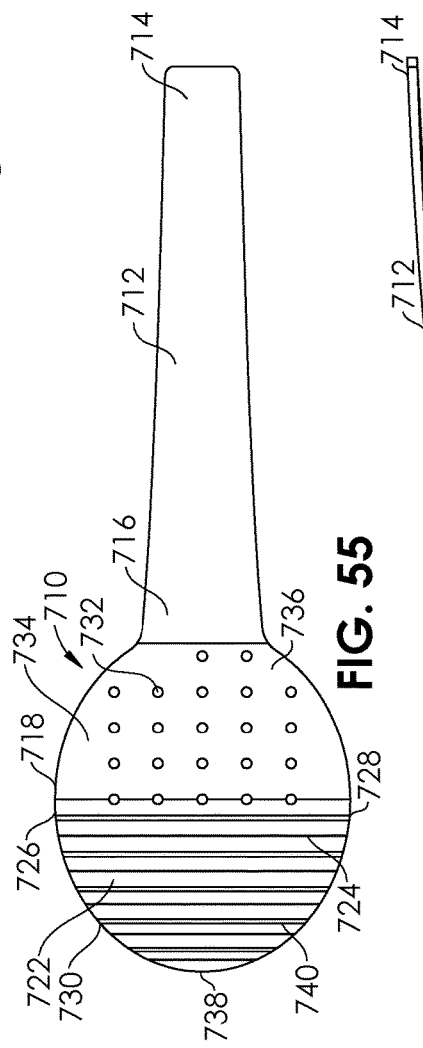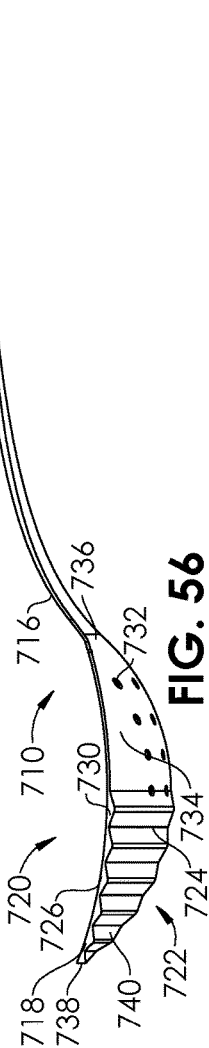

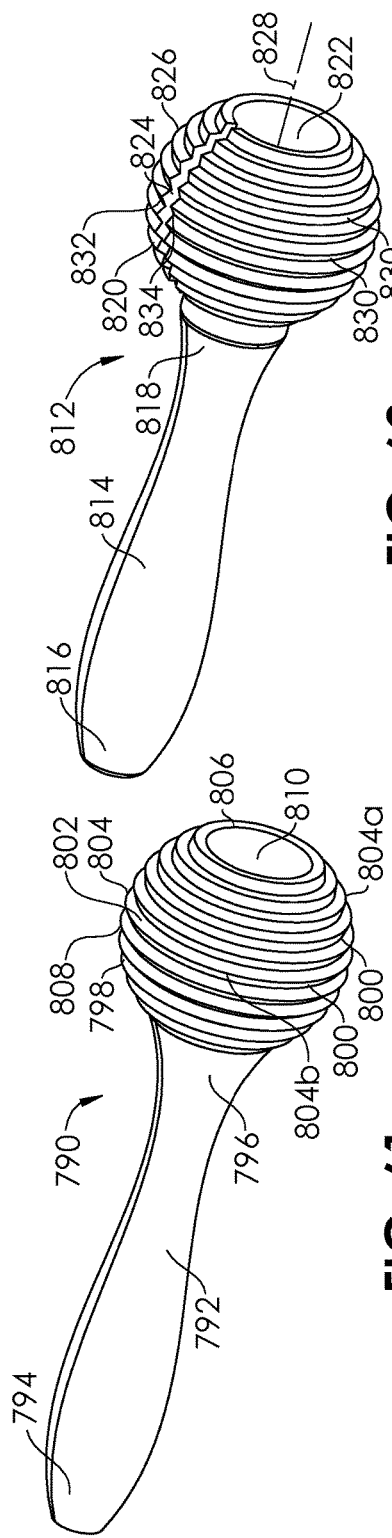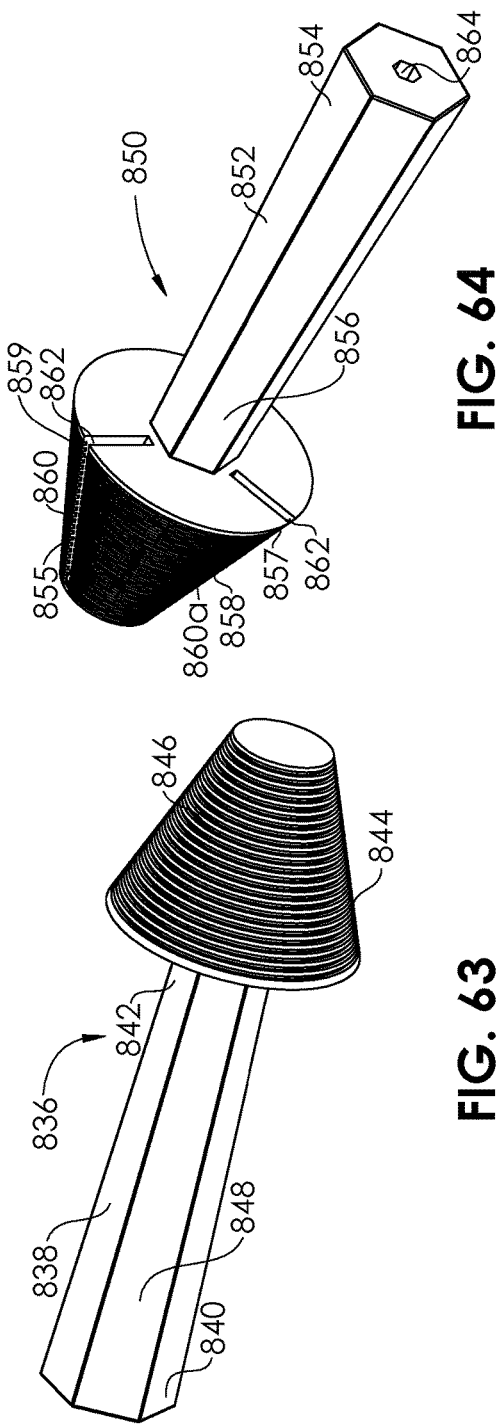

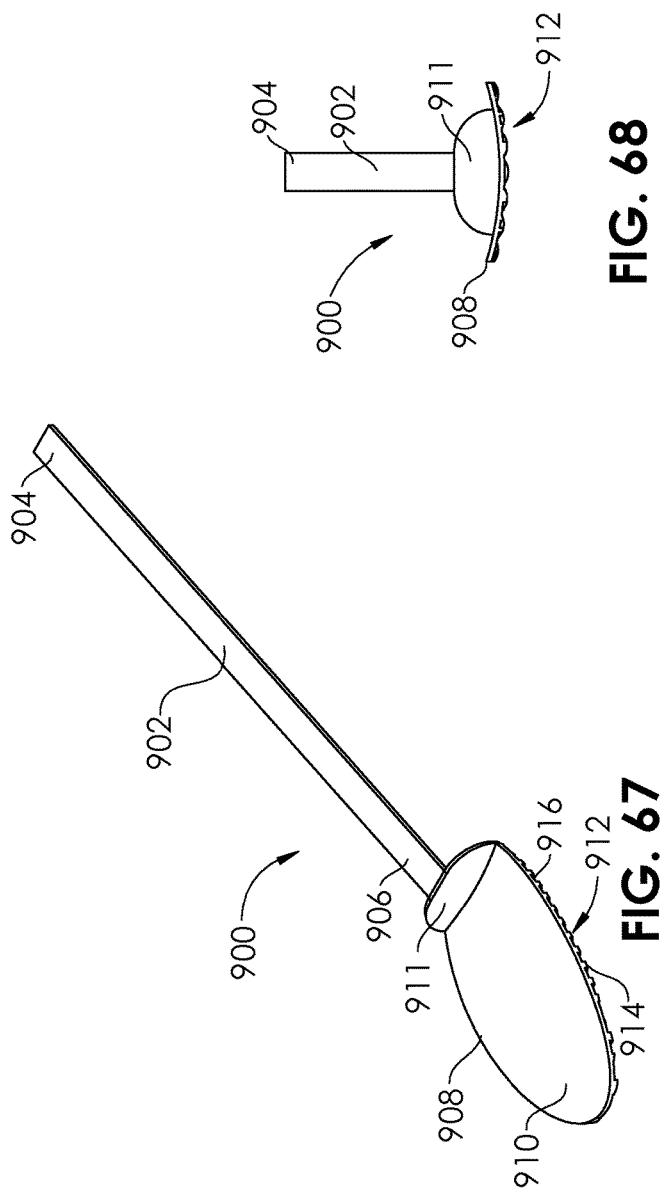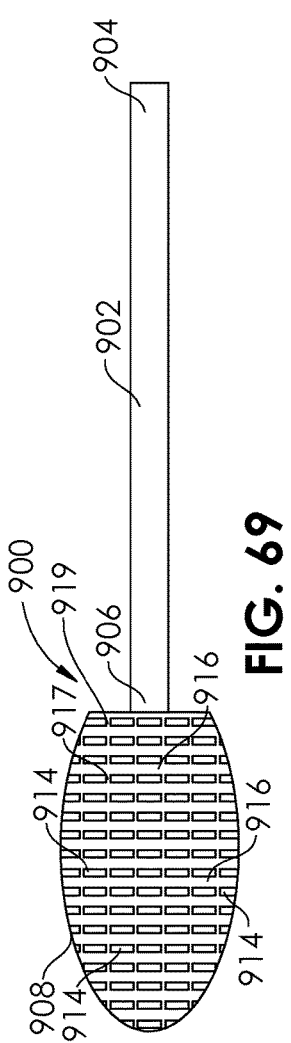

KITCHEN IMPLEMENTS FOR SEPARATING LIPIDS FROM FOOD

INCORPORATION BY REFERENCE TO ANY PRIORITY APPLICATIONS

This application claims the benefit of priority to U.S. Provisional Patent Application No. 62/535,811, filed on Jul. 21, 2017, which is incorporated by reference herein in its entirety for all purposes. Priority is claimed pursuant to 35 U.S.C. § 119.

FIELD OF THE INVENTION

The field of the invention generally relates to implements for use in cooking.

BACKGROUND

It is often desirable to remove fat or lipids from food. During the preparation of food having a large proportion of liquid, it is often desirable to skim away the liquid grease and/or the "suds" of foam material that forms on the surface of the liquid. A common method is to scoop these materials away using a spoon, a ladle, or a strainer. Oftentimes, using the spoon, ladle, or strainer can be inefficient or wasteful, such that a small amount of the grease is removed, while a large volume of the desired liquid is removed as well. The removal of grease or lipids from solid food may also be inefficient and time consuming. Grease or lipids may not drain away or separate from solid foods easily. It is desirable to have a utensil to easily and efficiently separate excess or unwanted grease and lipids away from food having either solid or liquid form.

SUMMARY OF THE INVENTION

In a first embodiment of the present disclosure, a hand-held kitchen utensil for removing lipids from food includes a handle having a first end, a second end, and a gripping region at or near the first end, a head coupled to the second end of the handle, the head having first side, a second side, and an outer perimeter, and wherein the first side includes at least one groove extending inwardly from a first groove end located at the outer perimeter, the at least one groove configured to collect a lipid material therein.

In another embodiment of the present disclosure, a kitchen utensil for removing lipids from food includes a handle having a first end, a second end, and a gripping region between the first end and the second end, a head extending from the second end of the handle, the head having first side, a second side, and an outer perimeter, and wherein the first side includes at least one groove extending inwardly from a first groove end located at the outer perimeter, the at least one groove configured to collect a lipid material therein.

In yet another embodiment of the present disclosure, a kitchen utensil for removing lipids from food includes a gripping surface configured to be held by the hand of a user, and a lipid engagement surface extending from the gripping surface, and including two or more elongate grooves configured to collect a lipid material therein.

In still another embodiment of the present disclosure, a method for removing lipids from food includes heating an edible material such that oil, fat or grease forms on a top portion of the edible material, providing a hand-held kitchen utensil including a handle having a first end, a second end, and a gripping region between the first end and the second end, a head extending from the second end of the handle, the head having first side, a second side, and an outer perimeter, and wherein the first side includes at least one groove extending inwardly from a first groove end located at the outer perimeter, the at least one groove configured to collect a lipid material therein, gripping the handle of the utensil, placing the head of the utensil in contact with at least some of the oil, fat or grease so that the oil, fat or grease is collected within the at least one groove, and removing the head from the edible material to separate the at least some of the oil, fat or grease from the edible material.

BRIEF DESCRIPTION OF THE DRAWINGS

FIG. 7 is a perspective view of a kitchen utensil according to an embodiment of the present disclosure.

FIG. 8 is a side view of the head of the kitchen utensil of FIG. 7.

FIG. 9A is a top view of the head of the kitchen utensil of FIG. 7.

FIG. 9B is a bottom view of the head of the kitchen utensil of FIG. 7

FIG. 10 is a perspective view of a kitchen utensil according to an embodiment of the present disclosure.

FIG. 11 is a side view of the head of the kitchen utensil of FIG. 10.

FIG. 12 is a top view of the head of the kitchen utensil of FIG. 10.

FIG. 16 is a perspective view of a kitchen utensil according to an embodiment of the present disclosure.

FIG. 17A is a side view of the head of the kitchen utensil of FIG. 16.

FIG. 17B is a top view of the head of the kitchen utensil of FIG. 16.

FIG. 19 is a perspective view of a kitchen utensil according to an embodiment of the present disclosure.

FIG. 20 is a top view of the head of the kitchen utensil of FIG. 19.

FIG. 21A is a front view of the head of the kitchen utensil of FIG. 19.

FIG. 21B is a side view of the head of the kitchen utensil of FIG. 19.

FIG. 23 is a perspective view of the head of a kitchen utensil according to an embodiment of the present disclosure.

FIG. 24 is a top view of the head of FIG. 23.

FIG. 25 is a side view of the head of FIG. 23.

FIG. 26 is a perspective view of a kitchen utensil according to an embodiment of the present disclosure.

FIG. 27 is a top view of the head of the kitchen utensil of FIG. 26.

FIG. 28 is a side view of the head of the kitchen utensil of FIG. 26.

FIG. 54 is a perspective view of a kitchen utensil according to an embodiment of the disclosure.

FIG. 55 is a bottom view of the kitchen utensil of FIG. 54.

FIG. 56 is a side view of the kitchen utensil of FIG. 54.

FIG. 61 is a perspective view of a kitchen utensil according to an embodiment of the present disclosure.

FIG. 62 is a perspective view of a kitchen utensil according to an embodiment of the present disclosure.

FIG. 63 is a perspective view of a kitchen utensil according to an embodiment of the present disclosure.

FIG. 64 is a perspective view of a kitchen utensil according to an embodiment of the present disclosure.

FIG. 67 is a perspective view of a kitchen utensil according to an embodiment of the present disclosure.

FIG. 68 is a front view of the kitchen utensil of FIG. 67.

FIG. 69 is a bottom view of the kitchen utensil of FIG. 67.

DETAILED DESCRIPTION OF THE ILLUSTRATED EMBODIMENTS

Figure 1:
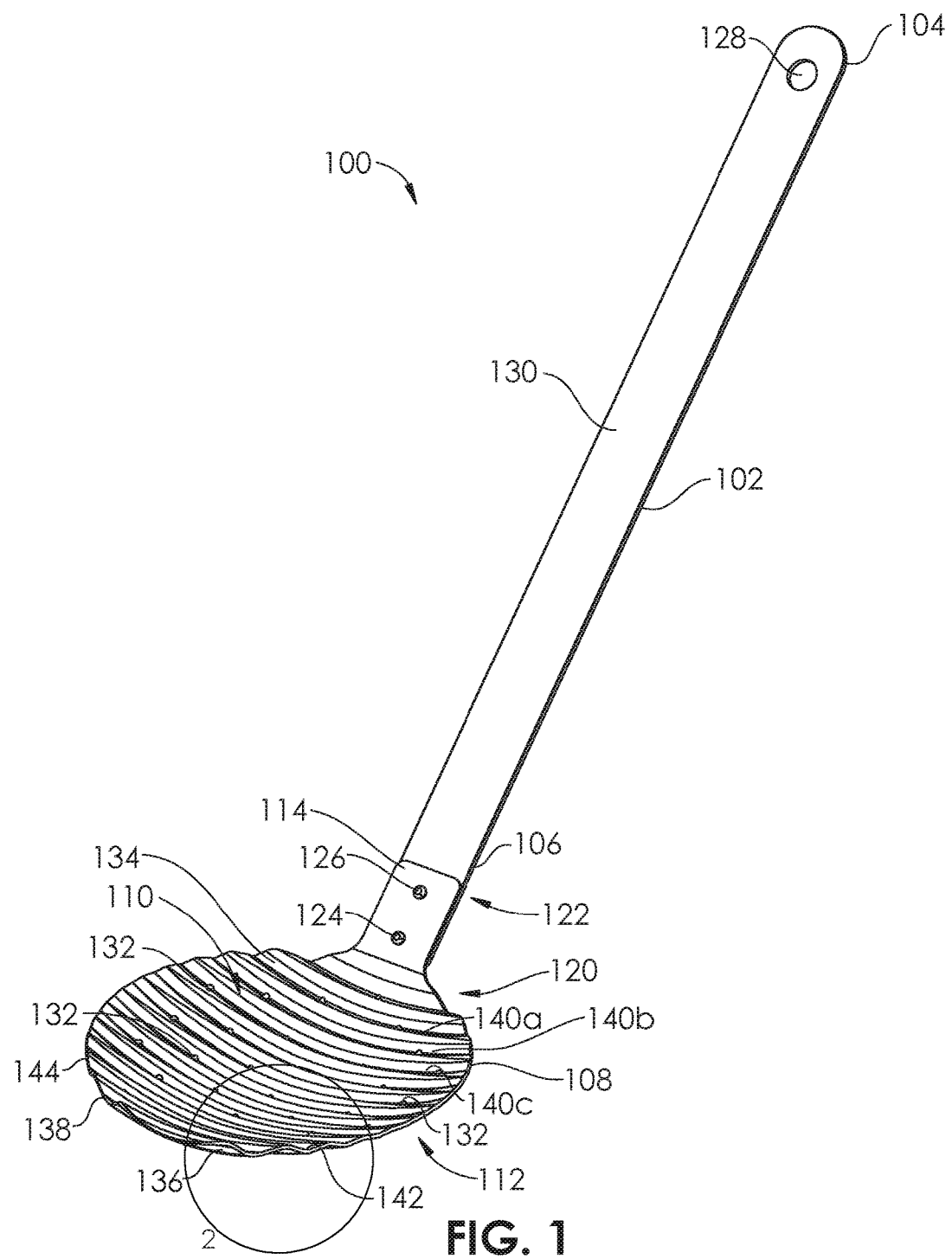
FIG. 1 is a perspective view of a kitchen utensil according to an embodiment of the present disclosure.

Cooking often produces or exposes lipids, which originate or emanate from animal or plant matter, such as meats, fats, eggs, daisy products or other animal materials, and produce, such as vegetables or fruits. Embodiments of the invention include a number of utensils used in cooking, particularly when cooking in the presence or potential presence of lipids, such as oil, grease, or fat, which may include shortening or lard. The lipids may be present in liquid, semi-liquid, paste, gel, semi-solid, or even solid form, or any combination thereof. The lipids may be present on liquid-based foods such as soups or stews, or may be carried on, in, or around solid foods such as meats. The utensils described in the embodiments herein are intended to aid the removal of at least some portion of the lipids from the foods. The term "kitchen utensil" is intended to generally describe any utensil that may be used during cooking, whether the cooking occurs within a personal or commercial kitchen, or outside of a kitchen, for example, in an outdoor cookout, a cooking show or presentation, a picnic, party, or other event. The term "culinary utensil" may also be used interchangeably with the term "kitchen utensil," maintaining the same, broad meaning. In some embodiments, the utensil may be intended only for the removal of lipids from food, while in other embodiments, the utensil may be intended to perform one or more other task, such as conveying liquids or solids, stirring, scooping, mashing, dividing, cutting, coring, drilling, heating, cooling, turning, flipping, scraping, funneling, grasping, whisking, grating, pressing or compressing, brushing, rolling, separating, dripping, drizzling, filtering, baking, frying, heating, or sifting. The utensil may comprise one or more of a skimmer, a ladle, a spoon, a scoop, a spatula, a stirrer, a separator, a sieve, a strainer, a filter, tongs, a funnel, or a scraper.

Some lipids may be considered healthful for certain groups of people, such as polyunsaturated fats, such as Omega-3 fatty acids found in fish oil, nuts, seeds, eggs, or other matter, or monounsaturated fat found in avocados. However, many lipids, including saturated fats or trans fats are a common source and instigator of many critical health problems, by increasing blood cholesterol levels, particularly low-density lipoproteins (LDL) levels. The effect of these "bad fats" may be to accelerate or precipitate cardiovascular disease, diabetes, cancer, and obesity. It is therefore desirable to remove fats and lipids from food, either from a mostly solid form like meats or from liquids such as soups.

Food preparation techniques often require separation of lipids such as grease, fat, or oils from food, in order to remove the "bad fats" for health reasons. Many health foods are prepared by removing as much of the lipids as possible. Additionally, certain recipes may require the separation of lipids from a first food product, so that the lipids may be partially or completely used for making a second, different food product. For example, a first soup or stew recipe may desire that fat and grease be removed from the soup or stew. However, a second recipe may make use of some or all of that same fat or grease. The fat or grease may be used to coat a pan or other container, to make it non-stick, or the fat or grease (e.g., suet) may be used as a base for a mixture, such as British Christmas pudding. In some cases, it may be desired to remove lipids from a soup in order to cook that soup, or to add ingredients to it, but then to add some or all of the removed lipids at a later time, for example, to add flavor without overcooking the lipids. This may be the case with certain lipids that change their flavor to an undesirable taste if overcooked.

Removal of grease or lipids from food that is in a solid state is commonly done, with lipids in liquid form often easily separable from the solid food. For example, to remove excess oil from fried chicken, the usual practice is to place the fried chicken over a wire rack to allow excess oil to drip off the meat. However, in certain recipes, the draining process may be too slow, and it is desirable for the oil separation from food to be more efficient. For example, grease in cooked ground meat can be slow to drain due to the small particles of meat that can cling to the grease. Many people resort to wiping the cooked ground meat with a piece of paper towel or an absorbent material. However, the wiping also tends to absorb (and thus remove) tasty juices that are desired to be maintained with the meat. It is often desirable to have a utensil that primarily captures the grease.

Often, food preparation methods may require the separation of lipids such as grease, fat, or oils from a water-based (aqueous) liquid. The water-based liquid may constitute a soup, broth, stock, bouillon, consommé. Within the water-based liquid, pieces of animal or plant matter are often heated along with the liquid. During the preparation of food with a large proportion of liquid, it is often desirable to skim away the liquid grease and/or the "suds" of foam material that forms on the surface of the liquid. The grease or liquid fat often result from meat, bones, or oil heated during an earlier stage in the cooking. The suds may comprise proteins that react during cooking to form a bubbly substance that is less dense than water or a water-based liquid. In many cases, the surface grease and the suds are an undesirable part of the soup or stock, and are typically removed. A common method is to scoop these materials away using a spoon, a ladle, or a strainer. Oftentimes, using the spoon, ladle, or strainer can be inefficient, ineffectual, or wasteful, such that a small amount of the grease is removed, while a large volume of the desired liquid is removed as well. A spoon may be used to attempt to separate the grease and suds, but the volume of grease and suds collected in most spoons is small relative to the total volume floating on top of the soup or stock. Commonly, the surface area of the top of the cooking container or pot is many times larger than the surface of the spoon, causing removal of the materials a labor-intensive and tedious procedure. Larger, specialized spoons or ladles are capable of scooping up larger amounts of grease or suds, but they also tend to pick up a significant amount of the desired soup or broth, oftentimes a larger volume of the desired soup or broth than the undesirable material. Fat and grease are usually less dense than water, and therefore float on the surface of a water-based soup or broth or stock. The layer of grease on the surface is often a thin film, thus the use of a spoon or ladle tends to lead to undesired removal of the soup or broth, as described.

Further complications are often encountered because of potential interactions and reactions between the utensil and the soup. Because the layer of grease lies on top of the soup, the active motion of a boiling soup also affects the layer of grease. A cook may ease the edge of a spoon or ladle into the soup or stock, in an attempt to only allow the layer of grease to flow into the spoon or ladle. Though this method can minimize the amount of desired soup or stock that is inadvertently scooped up, it often requires multiple repetitions to remove substantially all of the grease layer, and is thus quite tedious. The time delay in performing this method is further increased, because each pass with the spoon or ladle requires precision in order to assure that little or none of the soup is scooped up.

One method for separating grease involves pouring the soup into a separate container that has an opening at or near the bottom. Thus, the desired soup is poured from a bottom spout or valve, stopping when the top grease layer becomes lowered such that it almost reaches the spout or valve. Though this method eliminates the need to scoop, it does still require a separate container other than the cooking pot, and the transfer to and from the separate container. Additional containers also require additional cleanup and storage. One drawback of this method is that it is difficult to stop at the exact level, such that none of the desired soup is wasted. Also, if the volume of the soup is greater than the volume that the separate container can hold, then this method must be performed multiple times.

A ladle having a very shallow scoop does not immediately solve the problem of selectivity for the grease layer on top of a soup, because water and water-based liquids have a relatively high surface tension; when a drop of water is placed on many common surfaces, the water tends to bead (form a bead). Most grease, fat, or oil has a relatively lower surface tension, and tends to adhere like a film on many common surfaces. Even in a shallow scoop ladle, water-based liquids tend to form a large bulge, having a surface film comprising the grease. The ratio of the volume of grease collected to the volume of water-based liquid collected, would still be rather small, rendering the shallow ladle ineffective.

Multiple embodiments are described herein of kitchen utensils which more quickly and effectively provide removal of lipids such as fat and grease from cooked food, such as soups. Generally, the kitchen utensils as disclosed herein contain one or more elongate grooves that preferentially collect lipids while allowing water-based liquids to pass or be passed more freely out of the utensil. In some embodiments, the kitchen utensil may be configured to predominantly perform the separation of lips from food. In other embodiments, the kitchen utensil may be configured to additionally perform the other cooking-related tasks described herein. In some of the embodiments, the kitchen utensil maintains multiple functions, including at least the removal of lipids and a second function related to food preparation or kitchen maintenance.

Figure 5:
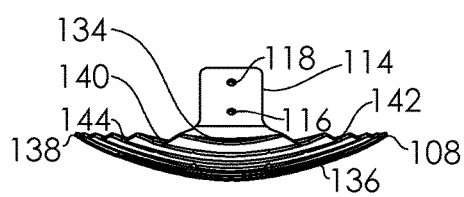
FIG. 5 is a front view of the head of the kitchen utensil of FIG. 1.
Figure 6:
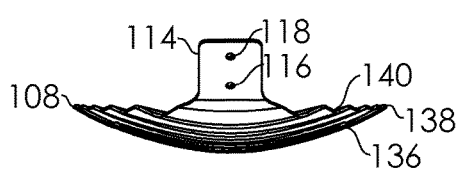
FIG. 6 is a back view of the head of the kitchen utensil of FIG. 1.

A kitchen utensil 100 is shown in FIG. 1 comprising a handle 102 having a proximal end 104 and a distal end 106, and a head 108 having a concave upper side 110 and a convex lower side 112. The head 108 also comprises a connection portion 114 having holes 116, 118 (FIGS. 4-6). The distal end 106 of the handle 102 includes holes 120, 122 which may be aligned with the holes 116, 118, respectively, of the connection portion 114 of the head 108, so that rivets 124, 126 may be secured through the holes 116, 120 and 118, 122, respectively, to secure the head 108 to the handle 102. Other securement means or methods may be used, instead of the rivets 124, 126 such as welding, soldering, brazing, adhesives, epoxy, binding, molding, overmolding, insert molding, or mechanical engagement (snapping, pressing together, crimping, screwing together, swaging). In some embodiments, the head 108 and handle 102 may be monolithic, and formed, cast, forged, 3D-printed, or molded from the same piece of material.

The proximal end 104 of the handle 102 includes a hole 128 which may be configured to be placed over a hook in order to hang and store in a kitchen or other location. The entire intermediate section 130 of the handle 102, between the proximal end 104 and the distal end 106, may be gripped by the hand of a user. A user may determine whether to grip the handle 102 more toward the proximal end 104 or more toward the distal end 106 depending on the hand size of the user, the hand strength of the user, whether the user is using one hand or both hands, the weight of the head 108 when empty or full of liquids and/or solid material from the food, or the length of time being held. In some embodiments, a protective coating or covering, such as a rubber outer sheath or coating may be applied over all or a portion of the handle 102, for example, a proximal-most portion of the handle adjacent the proximal end 104. Though the shape of the handle 102 is shown as straight in FIG. 1, in other embodiments, the handle 102 may have a variety of shapes including curved or angled portions. The handle 102 or the head 108 can each be constructed from a number of materials, including metals or polymers, such as stainless steel, copper, steel, iron, aluminum, anodized aluminum, titanium, ceramic, wood rubber, polytetrafluoroethylene (PTFE), polyamide (e.g. nylons), or polyetheretherketone (PEEK).

The head 108 of the kitchen utensil 100 of FIG. 1 is configured to be able to hold an aqueous (water-based) liquid in the concave upper side 110 for at least a period of time, although there are a series of holes 132 that pass through the head 108 between an upper surface 134 and a lower surface 136. In some embodiments, the holes 132 may be sized and numbered such that water-based liquids pass from the concave upper side 110, through the holes 132 and out at the convex lower side 112, when the kitchen utensil 100 is held in a position such that the head 108 has an orientation such that the concave upper side 110 is directed substantially upward and the convex lower side 112 is directed substantially downward. The at least temporary liquid carrying ability of the head 108 qualifies the kitchen utensil 100 to be termed a ladle or scoop. However, if used for predominantly for removing lipids, the kitchen utensil 100 may also correctly be called a skimmer. The diameter of the holes 132 may be increased and/or the total number of holes 132 may be increased, so that the residence time of the aqueous liquid in the concave upper side 110 is decreased. This may be desirable if the kitchen utensil 100 is to be used only as a skimmer. Conversely, if the kitchen utensil 100 is to be used as a scoop or ladle, the diameter of the holes 132 may be decreased and/or the total number of the holes 132 may be decreased in manner that controls the residence time of an aqueous liquid in the concave upper side 110 of the head 108. Holes may be eliminated completely in certain embodiments, wherein the adhesion of the grease to the grooves is sufficient without requiring the additional draining of aqueous liquid via the holes. A broth at room temperature at room temperature may have a dynamic viscosity close to 0.001 pascal-seconds, while the same broth heated close to 100° C. may have a dynamic viscosity close to 0.00028 pascal-seconds. When the broth is heated during cooking, it is commonly closer to the 100° C. boiling point (of water) than it is to room temperature, thus the sizing of the diameters and/or numbers of holes 132 may be chosen based on the residence time characteristics at or close to 100° C. In other embodiments, it may be desired to perform the removal of lipids from the broth after the cooked broth or soup has cooled a bit, and so an intermediate temperature may be chosen for the design of the hole diameters and/or numbers. Another factor that may be important in hole design is the total depth of the "scoop" portion of the ladle, which is the hollow portion defined by the concave upper side 110. The deeper this portion (the higher its height), the larger the initial pressure gradient caused by the hydrostatic pressure of the liquid, and thus, the larger the initial impetus to force the liquid through the holes 132.

Figure 4A:
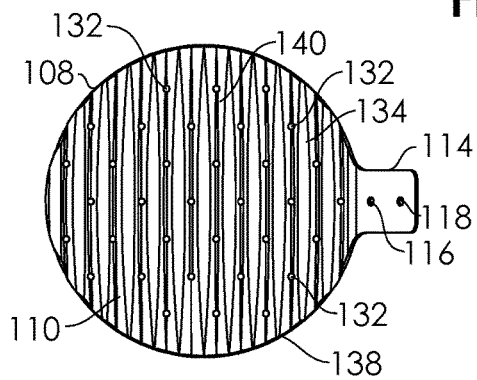
FIG. 4A is a top view of the head of the kitchen utensil of FIG. 1.
Figure 4B:
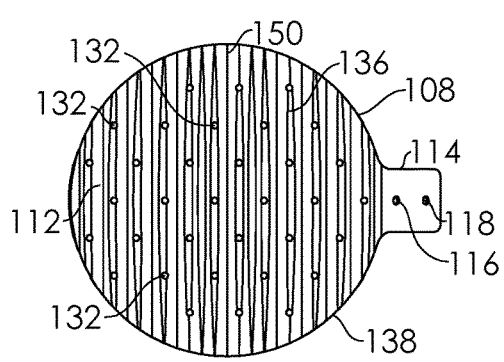
FIG. 4B is a bottom view of the head of the kitchen utensil of FIG. 1.

The head 108 comprises an outer perimeter 138 having a circular or mostly circular shape, as shown in the top view of the head 108 in FIG. 4A and the bottom view of the head 108 in FIG. 4B. In other embodiments, the head 108 may have non-circular shapes, such as ellipses, ovals, squares, rectangles, triangles, polygons, or other shapes. A series of grooves 140 are formed in the concave upper side 110, each groove beginning at the outer perimeter 138 at a first point 142 and extending along the concave upper side 110 to a second point 144 on the outer perimeter 138, opposite the first point 142. Because grease and oils have lower surface tension than the water-based broth or soup, the grease and oils tend to adhere to the upper surface 134, and particularly within the grooves 140. The grooves 140 create a larger surface area for the grease, fat, oil to adhere to, and also serve to pool the grease, fat, oil within the "valleys" formed by the grooves. Once the head 108 of the kitchen utensil 100 pools a sufficient amount of lipids within its grooves 140, and the aqueous broth or soup is allowed to drain out through the holes 132, and back into the cooking pot, the head 108 of the kitchen utensil 100 may be moved to a location over a trash receptacle or other container and the head 108 may be tilted so that gravity causes the lipids to slide out from the grooves 140 and into the receptacle. The head 108 of the kitchen utensil 100 may then be placed back within the broth. Grease and oils tend to have a significantly higher viscosity than water, even when both are heated to elevated temperatures approaching or including 100° C.

Figure 2:
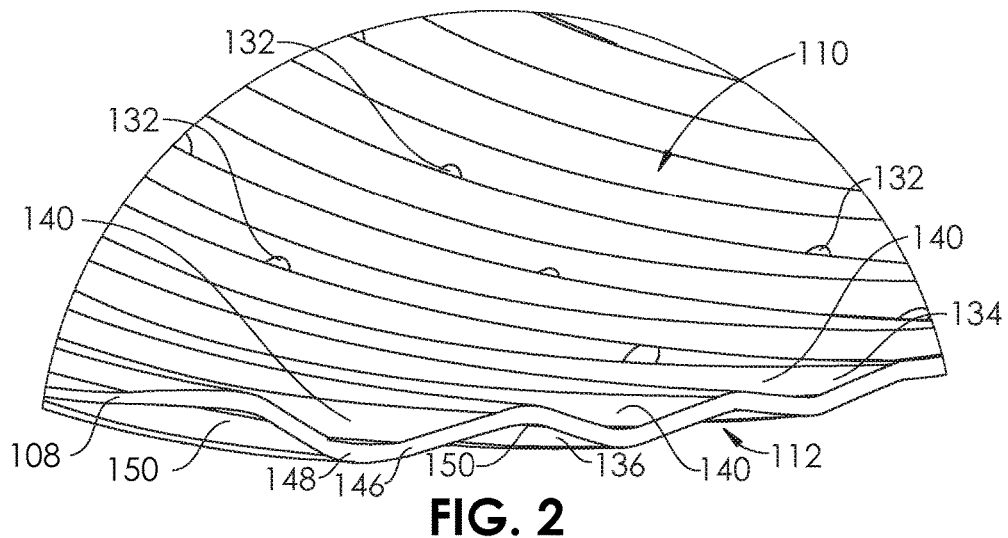
FIG. 2 is a detail view of the kitchen utensil of FIG. 1 taken within circle 2.
Figure 3:
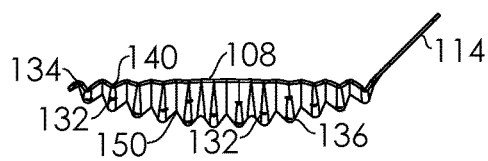
FIG. 3 is a side view of the head of the kitchen utensil of FIG. 1.

FIG. 2 illustrates the manner in which the grooves 140 (140a, 140b, 140c, etc.) are formed in the head 108. The grooves 140 are created by undulations 146 in the wall 148 of the head 108. Thus, there additional underside grooves 150 formed in the convex lower side 112 of the head 108, in between the grooves 140. The grooves 150 are configured so that the kitchen utensil 100 may also trap lipids on the lower side 112, within the grooves 150. The holes 132 may be formed by drilling, laser machining, water jet machining, molding, or directly in a forming, casting, forging, molding, or 3D-printing process. The grooves 150 are shown in more detail in FIG. 4. The holes 132 are located at the bottom of the grooves 140, in the center of the valleys formed by the grooves 140, and thus, between the grooves 150. In other embodiments, the holes 132 may be located between the grooves 140. In other embodiments, some of the holes 132 may be located at the bottom of the grooves 140, and other holes 132 may be located between the grooves 140.

A kitchen utensil 152 is shown in FIG. 7 comprising a handle 154 having a proximal end 156 and a distal end 158, and a head 160 having a concave upper side 162 and a convex lower side 164. The head 160 is integral to the handle 154 with an intermediate transition section 166. The kitchen utensil may be formed, cast, forged, molded, or 3D-printed in one piece, or the handle 154 may be combined with the head 160 by a welding or other heat forming process. The handle 154 comprises a first straight section 168 extending from the head 160 which terminates at a first curve 170. The first curve 170 continues to a second curve 172 and then to a second straight section 174. As shown, the second straight section 174 has a slight curve, but is substantially straight. The second straight section 174 is oriented at an angle A from the first straight section 168. The angle A may range from between about 5° and about 120°, or between about 10° and about 90°, or between about 15° and about 75°. The concavity 176 formed by the first curve 170 is configured to allow the kitchen utensil 152 to be hooked to the wall of a cooking pot. The length of the first straight section 168 may be controlled so that the head 108 of the kitchen utensil 152 hangs at a desired height within the cooking pot. The kitchen utensil 152 may be hung by the concavity 176 in order to keep the handle 154 from sliding or falling into the cooking pot. A hooked end 178 of the handle 154 is configured to allow the kitchen utensil 152 to be hung on a horizontal rod, a shelf end, a horizontal line or wire, a ring, or a hook. A dipped plastic or rubber coating 180 is formed on the handle 154 at least partially on the second straight section 174 and on the hooked end 178. A user may grip the second straight section 174, for example, on the coating 180, when using the kitchen utensil 152. The user may also grip the kitchen utensil 152 on the first straight section 168, or even at one or both of the first and second curves 170, 172.

The head 160 comprises an outer perimeter 182 and a series of holes 184 configured to allow the passage of aqueous liquid. A series of grooves 186 extend from a first point 188 on the outer perimeter 182 to a second point 190 on the outer perimeter 182 and opposite the first point 188. Turning to FIG. 8, a wavy undulation 192 in the wall 194 of the head 160 forms the grooves 186, as well as grooves 196 in the convex lower side 164 of the head 160. The holes 184 are located at the bottom of the grooves 186, in the center of the valleys formed by the grooves 186, and thus, between the grooves 196. In other embodiments, the holes 184 may be located between the grooves 186. In other embodiments, some of the holes 184 may be located at the bottom of the grooves 186, and other holes 184 may be located between the grooves 186. The undulations 146, 192 of the heads 108, 160 may follow any repeating pattern and thus the shapes or cross-sections of the grooves 140, 186 may be sinusoidal, V-shaped, U-shaped, and may even involve an increase or decrease in frequency from groove to groove (row to row). The undulations 192 of the head 160 have approximately constant groove amplitude or height, such that the undulations 192 of the head 160 are visible at the outer perimeter 182, as seen in FIGS. 7 and 8.

A kitchen utensil 200 is shown in FIG. 10 comprising a handle 202 having a proximal end 204 and a distal end 206, and a head 208 having a concave upper side 210 and a convex lower side 212. The head 208 also comprises a connection portion 214 having holes 216, 218 (FIG. 12). The distal end 206 of the handle 202 includes holes (not shown) which may be aligned with the holes 216, 218 of the connection portion 214 of the head 208, so that rivets 224, 226 may be secured through the holes to secure the head 208 to the handle 202. Other securement means or methods may be used, instead of the rivets 224, 226 such as welding, soldering, brazing, adhesives, epoxy, binding, molding, overmolding, insert molding, or mechanical engagement (snapping, pressing together, crimping, screwing together, swaging). In some embodiments, the head 208 and handle 202 may be monolithic, and formed, cast, forged, 3D-printed, or molded from the same piece of material. The materials of any of the embodiments in this disclosure may be the same as those already described herein. The handle 202 includes a hole 203 configured for hanging the kitchen utensil 200.

Turning to FIG. 12, grooves 228 are formed in the concave upper side 210, and extend from points on the outer perimeter 230 of the head 208. A series of holes 232 pass through the wall 234 of the head 208, and are located in the bottom of the grooves 228. Though the grooves 228 are shown extending in a transverse direction in relation to a vertical plane 229 which bisects the handle 202, in alternative embodiments, the grooves 228 may extend in other directions, including a direction 90° from that depicted, and thus parallel to the vertical plane 229 which bisects the handle 202. FIG. 11 illustrates grooves 236 in the convex lower side 212. The grooves 228 have a primary width $W_1$, and flare or increase to an end width $W_2$ at the outer perimeter 230. The increased end width $W_2$ is configured to pool a larger portion of received lipids closer to the outer perimeter 230, making it easier and quicker to dispose of these lipids when they are poured off the outer perimeter 230. The width change may be used alone or combined. The width increase may be linear, non-linear, or may have a particular non-linear shape, as shown in FIG. 12. Note that the different grooves 236 have particular flaring that follows at least somewhat the contours of the concave upper side 210, though this is not required. Flare 238a, for example, is substantially non-symmetric, while Flare 238b is substantially symmetric. The flares 238 in the grooves 236 are configured to aid the release of the contained lipids from the upper surface 240, when the head 208 is inverted partially or completely, for example, 45° or more, 60° or more, or 90° or more from normal up-down orientation. Normal up-down orientation is wherein the concave upper side 210 is oriented substantially upward and the convex lower side 212 is oriented substantially downward. The flaring can serve to increase the ease of use of the kitchen utensil 200, in conjunction with variations to the shape, size, or symmetry of the head 208.

Figure 13:
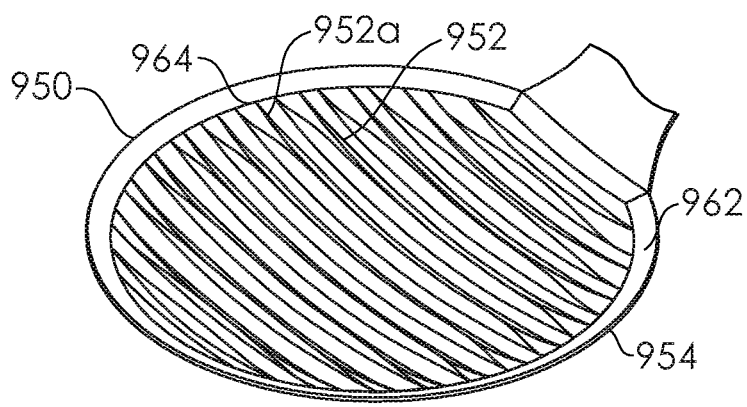
FIG. 13 is a perspective view of a kitchen utensil head according to an embodiment of the present disclosure.
Figure 14:
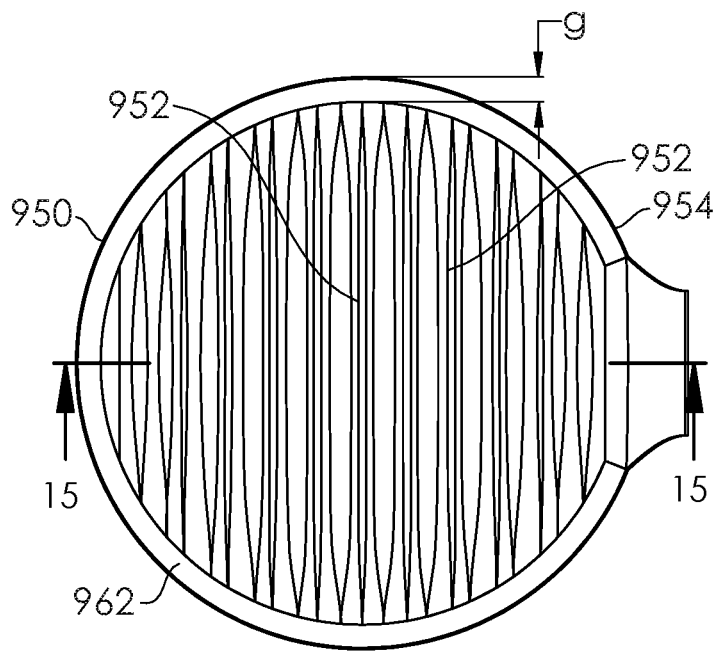
FIG. 14 is a top view of the head of the kitchen utensil of FIG. 13.
Figure 15:
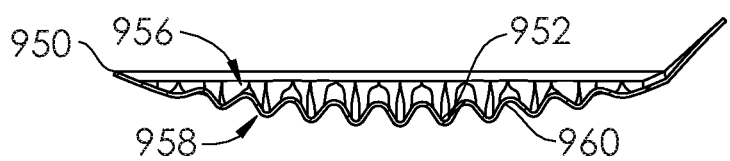
FIG. 15 is a cross-sectional view of the head of the kitchen utensil of FIG. 13 taken along lines 15-15 of FIG. 14.

A head 950 shown in FIGS. 13-15 has a similar shape to the head 208 of FIG. 10, but comprises one or more grooves 952 starting at a small gap g from the outer perimeter 954. The upper side 956 includes the grooves 952 while the lower side 958 includes underside grooves 960. The substantially planar or non-grooved outer perimeter 954 of the head 950 of the utensil allows for a multi-purpose use of the utensil. In contrast to the undulations 192 of the head 160 of the kitchen utensil 152 of FIGS. 7-8, which are visible along the outer perimeter 182 of the head 160, the grooves 952 of the head 950 have groove amplitudes or heights that taper or decrease to a substantially flat or smooth edge 962 at the outer perimeter 954, as shown in FIG. 13. The first point 964 of a groove 952*a* may be located at the outer perimeter 954 or a distance away from the outer perimeter 954 (e.g., gap g). The edge 962 of the outer perimeter 954 allows the utensil to be more efficiently utilized as a spoon or ladle for generic cooking purposes. These features allow for a multi-purpose use of the same utensil.

A kitchen utensil 242 is shown in FIG. 16 comprising a handle 244 having a proximal end 246 and a distal end 248, and a head 250 having a concave upper side 252 and a convex lower side 254. The head 250 also comprises a connection portion 253 having holes 254, 256 (FIG. 17B). The distal end 248 of the handle 244 includes holes (not shown) which may be aligned with the holes 254, 256 of the connection portion 253 of the head 250, so that rivets 258, 260 may be secured through the holes to secure the head 250 to the handle 244. Other securement means or methods may be used, instead of the rivets 258, 260 such as welding, soldering, brazing, adhesives, epoxy, binding, molding, overmolding, insert molding, or mechanical engagement (snapping, pressing together, crimping, screwing together, swaging). In some embodiments, the head 250 and handle 244 may be monolithic, and formed, cast, forged, 3D-printed, or molded from the same piece of material. The materials of any of the embodiments in this disclosure may be the same as those already described herein. The handle 244 comprises a formed wire 262 having a first extension 264, a second extension 266, and an intermediate curve 268. A concavity 270 formed by the intermediate curve 268 may be used for hanging the kitchen utensil 242.

The head 250 includes a series of non-linear grooves 272 formed in the concave upper side 252. The particular curvature of each of the non-linear grooves 272 follows at least somewhat the contours of the concave upper side 210, though this is not required. This arrangement may allow a larger number of rows of the grooves 272 within a particular head 250 having a specific size and shape. The arrangement may also allow a more consistent groove depth and width in embodiments wherein this is desired. Referring to FIG. 17B, it can be seen that groove 272*a* has a smaller minimum radius of curvature (in this particular projection) than groove 272*b*. Though symmetry is not required, symmetry is present in the head 250. For example, groove 272*b* is symmetric to groove 272*c*. Rectangular holes 274 project through the wall 276 of the head 250 and are configured for draining aqueous liquid. In this embodiment, the holes 274 are located at the bottom and center of the grooves 272. It should be noted that, while the grooves in the prior embodiments are also non-linear, the non-linear grooves 272 also have non-linearity in the FIG. 17B projection, in contrast to the head 160 in the FIG. 9A projection. Grooves 278 in the convex lower side 254 are visible in FIG. 17A. The head 250 comprises an outer perimeter 251 that includes a first point 255, a second point 257, a distal end 259, a handle connection transition edge 261, and a second handle connection transition edge 263.

Figure 18:
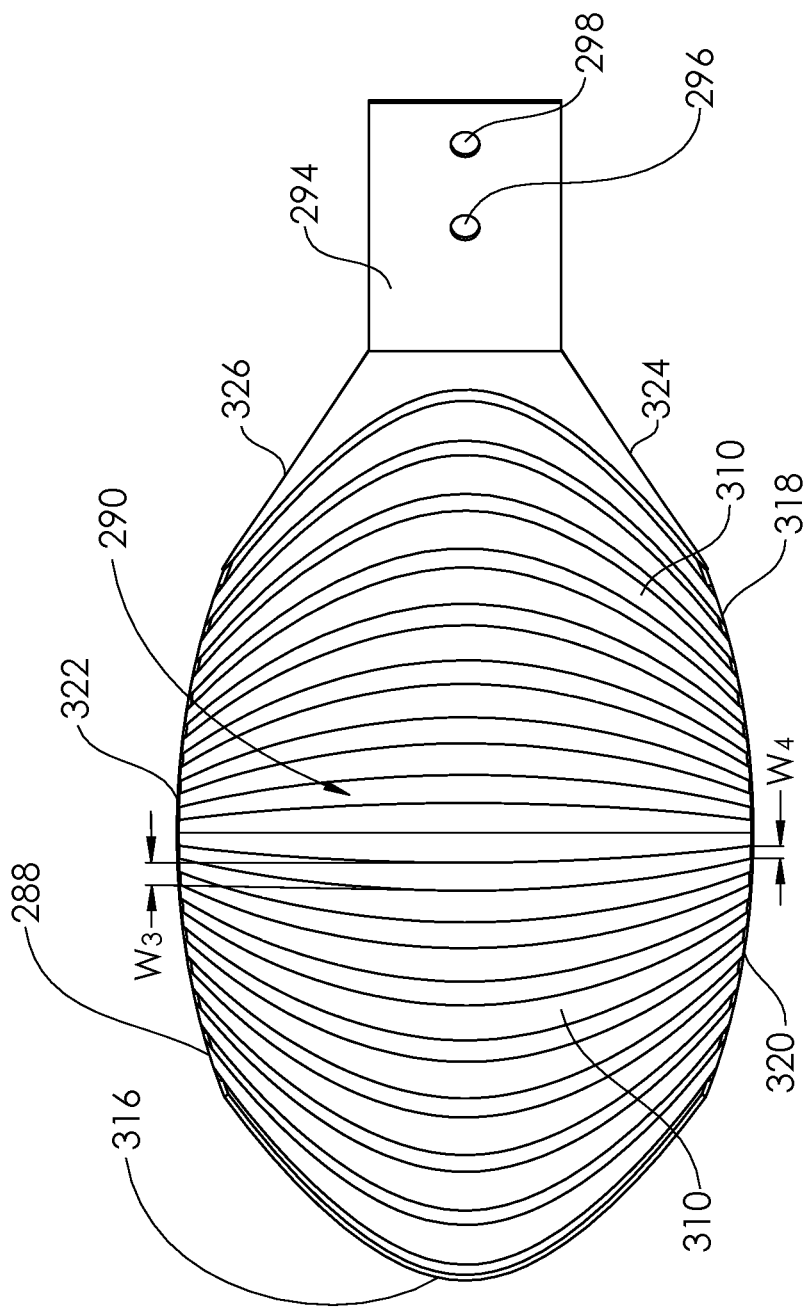
FIG. 18 is a top view of a head of a kitchen utensil according to an embodiment of the present disclosure.

A head 288 of a kitchen utensil, shown in FIG. 18, comprises a concave upper side 290 and a convex lower side (not shown) having a connection portion 294 with holes 296, 298 on the connection portion 294 of the head 288 that connects to a handle (not shown) similar to prior embodiments. The head 288 includes non-linear grooves 310 that are similar to the non-linear grooves 272 of the head 250 of the kitchen utensil 242 of FIGS. 16-17B, except that the head 288 of the kitchen utensil 280 does not have holes. Holes may be purposely avoided in some embodiments, for example, if the head 250 is configured to be used with foods having desired particles that are smaller in size than most holes, thus avoiding the passage of such particles through the holes and the subsequent loss of the particles. The grooves 310 have a primary width W3, and narrow to an end width W4 at the outer perimeter 318. The outer perimeter 318 of the head 288 includes a first point of the groove 320, a second point of the groove 322, the distal edge 316, a first handle transition connection edge 324, and a second handle transition connection edge 326.

Several embodiments of kitchen utensils having a primarily lifting, turning, or flipping function are now described which also feature the lipid separation function of the embodiments previously disclosed. Lifting, turning, or flipping utensils may be called spatulas, turners, flippers, or palettes.

A kitchen utensil 330 is shown in FIG. 19 comprising a handle 332 having a proximal end 334 and a distal end 336, and a head 338 having an upper side 340 and a lower side 342. The head 338 also comprises a connection portion 344 having holes 346, 348 (FIG. 20). The distal end 336 of the handle 332 includes holes (not shown) which may be aligned with the holes 346, 348 of the connection portion 344 of the head 338, so that rivets 350, 352 may be inserted through the holes to secure the head 338 to the handle 332. Other securement means or methods may be used, instead of the rivets 350, 352 such as welding, soldering, brazing, adhesives, epoxy, binding, molding, overmolding, insert molding, or mechanical engagement (snapping, pressing together, crimping, screwing together, swaging). In some embodiments, the head 338 and handle 332 may be monolithic, and formed, cast, forged, 3D-printed, or molded from the same piece of material. The materials of any of the embodiments in this disclosure may be the same as those already described herein. The handle 332 is angled and includes a first extension 354 and a second extension 356. The first extension 354 is angled from the second extension 356 by an angle C of between about 175° and about 90°, or between about 150° and about 120°. A hole 358 in the proximal end 334 of the handle 332 is configured for hanging the kitchen utensil 330.

The head 338 includes several grooves 362 extending from the outer perimeter 364 at the upper side 340. The head 338 includes a series of holes 360 passing between the upper side 340 and the lower side 342. The grooves 362 of the head 338 are arranged in a proximal to distal manner, substantially parallel to a plane containing the handle 332. Though the grooves 140, 150, 186, 196, 228, 236, 272, 278, 310 of the prior embodiments presented in FIGS. 1-18 are shown extending laterally (from one side to another), alternative embodiments may instead comprise proximal to distal extending grooves. Likewise, the grooves 362 of the head 338 may alternatively extend laterally. In some embodiments, grooves may extend neither laterally nor proximal to distal, but at an intermediate angle.

The grooves 362 are formed by a repeating U-shaped pattern 366 in the wall 368 of the head 338, which also forms grooves 341 in the flat lower side 342 of the head 338. The upper side 340 forms a flat upper surface 343 which is defined by the maximal projections 370 in the repeating U-shaped pattern 366 of the wall 368 of the head 338. The maximal projections 370 may be grinded flat in a secondary operation. The flat upper surface 343 contains a sufficient amount of surface area, and the distance d between each successive maximal projection 370 is small enough such that the flat upper surface 343 is configured to effectively lift, hold, and flip solid or semi-solid food items (hamburgers, sausages, steaks, etc.) from a grill, oven, or stove when the kitchen utensil 330 is manipulated by a user. The grooves 362 are configured to collect lipids as described in relation to the grooves 140, 186, 228, 272, 310 of the previous embodiments. The holes 360 are configured to allow water-based liquids to pass or be passed more freely out of the utensil. Once oil or grease is collected in the grooves 362, the head 338 of the kitchen utensil 330 (after the food item has been removed) may be placed over a trash receptacle or other receptacle and tilted to 45° or greater or 90° or greater, so that the collected lipids are able to slide out of the grooves 362 and into the receptacle. The upper side 340, including the maximal projections 370 and flat upper surface 343 may comprise or be coated or treated with a non-stick material such as polytetrafluoroethylene (PTFE) or silicone. The grooves 362 may also comprise or be coated with said material. Any portion of the lower side 342, may also comprise or be coated with the said material.

Figure 22:
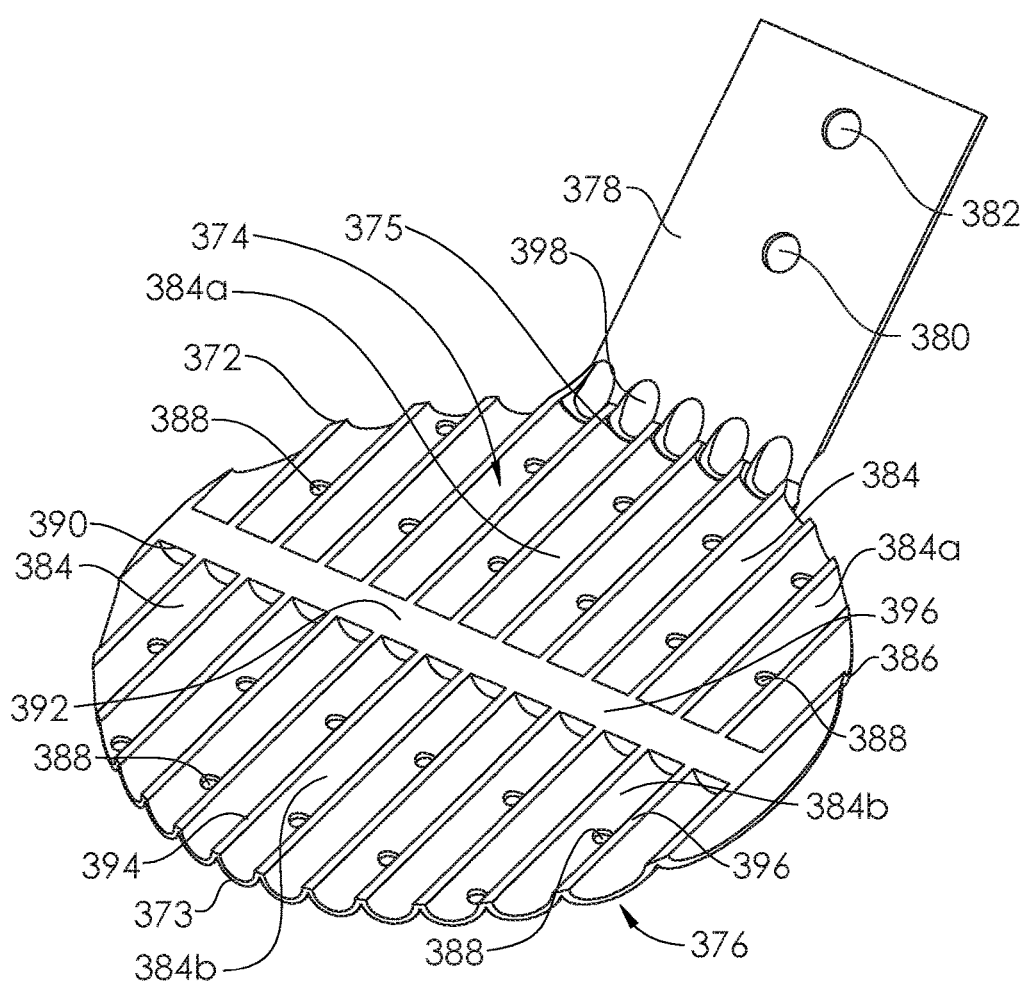
FIG. 22 is a perspective view of an alternative head of a kitchen utensil according to an embodiment of the present disclosure.

FIG. 22 illustrates an alternative head 372 having an upper side 374 and a lower side 376. The head 372 may be used in place of the head 338 of the kitchen utensil 330 of FIGS. 19-21B. The head 372 comprises a connection portion 378 having holes 380, 382. The head 372 includes several grooves 384 extending from the outer perimeter 386 at the upper side 374. The head 372 includes a series of holes 388 passing between the upper side 374 and the lower side 376. The grooves 384 of the head 372 are arranged in a proximal to distal manner, substantially parallel to a plane containing the handle 332 and extending from a distal portion 373 to a proximal portion 375. In some embodiments, the grooves 384 of the head 372 may alternatively extend laterally. In some embodiments, grooves may extend neither laterally nor proximal to distal, but at an intermediate angle.

An intermediate discontinuity 390 comprises a laterally extending, elevated flat that separates the grooves into a proximal groove portion 384a and a distal groove portion 384b. The elongate rectangular surface area of the flat upper face 392 of the intermediate discontinuity 390 increases the amount of flat upper surface area, to aid in lifting, holding, and turning solid or semi-solid food items or pieces. The holes 388 are configured to allow water-based liquids to pass or be passed more freely out of the utensil. Once oil or grease is collected in the grooves 384, the head 372 may be placed over a trash receptacle or other receptacle and tilted down to 45° or greater or 90° or greater, so that the collected lipids are able to slide out of the grooves 384 and into the receptacle. The upper side 374, including the maximal projections 394 and flat upper surface 396 (which may include the flat upper face 392 of the intermediate discontinuity 390) may comprise or be coated or treated with a non-stick material such as polytetrafluoroethylene (PTFE) or silicone. The grooves 384 may also be coated with said material. Any portion of the lower side 376, may also comprise or be coated with the said material. A user may tilt the distal portion 373 below horizontal (e.g., 45° or more, or 90° or more), so that lipids collected within one or more of the distal groove portions 384b are able to slide out of the distal groove portions 384b, thus emptying out the distal groove portions 384b for further use. A user may also tilt the proximal portion 375 below horizontal (e.g., 45° or more, or 90° or more), so that lipids collected within one or more of the proximal groove portions 384a are able to slide out of the proximal groove portions 384a, thus emptying out the proximal groove portions 384a for further use. Openings 398 in the connection portion 378 allow the lipids collected within the centrally-located proximal groove portions 384a to slide out and be discarded (or retained in another location). In embodiments wherein the grooves extend laterally, instead of proximal-to-distal, the openings 398 may not be needed.

An alternative head 400 having an upper side 402 and a lower side 404 is shown in FIGS. 23-25. The head 400 may be coupled to any of the handles disclosed herein using any of the joining methods described, or may be made integral with a handle. The head 400 comprises a connection portion 406 having holes 408, 410. The head 400 includes several grooves 412 extending from the outer perimeter 414 at the upper side 402. The head 400 includes a series of circular holes 416 and elongated holes 418 passing between the upper side 402 and the lower side 404. The grooves 412 of the head 404 are arranged in a laterally extending manner, substantially perpendicular to a plane containing the handle, and extending from a first lateral side 420 and a second lateral side 422. In some embodiments, the grooves 412 of the head 400 may alternatively extend proximal-to-distal. In some embodiments, grooves may extend neither laterally nor proximal 424 to distal 426, but at an intermediate angle. The wall 428 of the head 400 includes a repeated V-shaped pattern 430 having upper peaks 432 and lower peaks 434, with the grooves 412 extending between successive upper peaks 432 and lower grooves 436 extending between successive lower peaks 334. The upper peaks 432 comprise parallel lines with substantially every point having the same elevation with respect to the longitudinal axis 438. Thus, a flat platform 440 is formed, and configured for lifting, holding, and flipping (turning) solid or semi-solid food items. In some embodiments, the elongated holes 418 and the circular holes 416 are configured on a given head such that should any hole be obstructed by food crumbs or particles that mostly comprise of a particular shape and size, aqueous liquid is able to pass through the other shaped holes.

A kitchen utensil 450 is shown in FIG. 26 comprising a handle 452 having a proximal end 454 and a distal end 456, and a head 458 having an upper side 460 and a lower side 462. The head 458 also comprises a connection portion 464 having holes 466, 468 (FIG. 27). The distal end 456 of the handle 452 includes holes (not shown) which may be aligned with the holes 466, 468 of the connection portion 464 of the head 458, so that rivets 470, 472 may be inserted through the holes to secure the head 458 to the handle 452. Other securement means or methods may be used, instead of the rivets 470, 472 such as welding, soldering, brazing, adhesives, epoxy, binding, molding, overmolding, insert molding, or mechanical engagement (snapping, pressing together, crimping, screwing together, swaging). In some embodiments, the head 458 and handle 452 may be monolithic, and formed, cast, forged, 3D-printed, or molded from the same piece of material. The materials of any of the embodiments in this disclosure may be the same as those already described herein. The handle 452 comprises a frame 474 that is coupled to a gripping portion 476. The gripping portion 476 extends between its proximal end 478 and distal end 480, and may comprise wood, a polymer, a composite material, or any other material with a low thermal conductivity. For example, the thermal conductivity may be 2.0 W/(m·K) or less, or 1.0 W/(m·K) or less, or 0.5 W/(m·K) or less, or 0.2 W/(m·K) or less.

The head 458 includes several grooves 482 extending from the outer perimeter 484 at the upper side 460. The head 458 includes a series of circular holes 486 passing between the upper side 460 and the lower side 462. The grooves 482 of the head 458 are arranged in a laterally extending manner, substantially perpendicular to a plane containing the handle 452, and extending from a first lateral side 488 and a second lateral side 490. In some embodiments, the grooves 482 of the head 458 may alternatively extend proximal-to-distal. In some embodiments, grooves may extend neither laterally nor proximal 492 to distal 494, but at an intermediate angle. The wall 496 of the head 458 includes a repeated V-shaped pattern 498 having upper peaks 497 and lower peaks 499, with the grooves 482 extending between successive upper peaks 497 and lower grooves 495 extending between successive lower peaks 499. The upper peaks 497 comprise parallel lines with substantially every point having the same elevation with respect to the longitudinal axis 493. Thus, a flat platform 491 is formed, and configured for lifting, holding, and flipping (turning) solid or semi-solid food items. The flat platform 491, like the head 458, has a substantially oval or rectangular shape aspect ratio, being longer (proximally to distally) than it is wide (laterally). Thus, the kitchen utensil 450 is usable as an elongated turner, though can also perform as a skimmer, as described herein.

Figure 29:
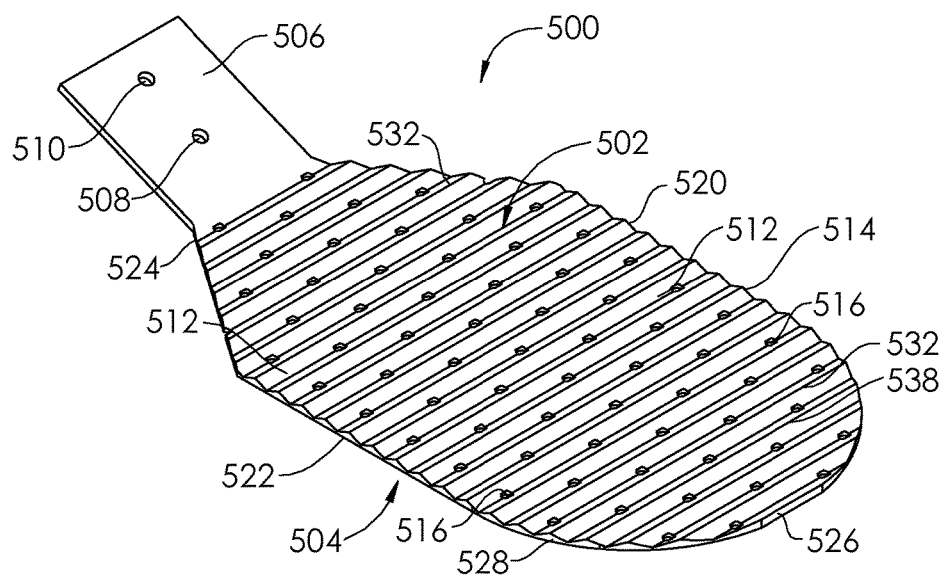
FIG. 29 is a perspective view of the head of a kitchen utensil according to an embodiment of the present disclosure.
Figure 30:
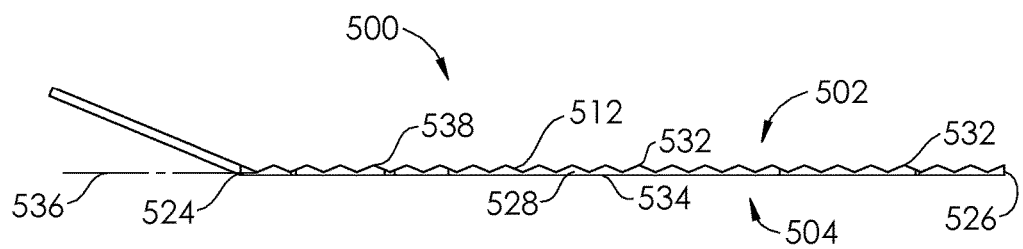
FIG. 30 is a side view of the head of FIG. 29.

An alternative head 500, similar to head 458, and having an upper side 502 and a lower side 504 is shown in FIGS. 29-30. The head 500 may be coupled to any of the handles disclosed herein using any of the joining methods described, or may be made integral with a handle. The head 500 comprises a connection portion 506 having holes 508, 510. The head 500 includes several grooves 512 extending from the outer perimeter 514 at the upper side 502. The head 500 includes a series of holes 516 passing between the upper side 502 and the lower side 504. The grooves 512 of the head 500 are arranged in a laterally extending manner, substantially perpendicular to a plane containing the handle, and extending from a first lateral side 520 and a second lateral side 522. In some embodiments, the grooves 512 of the head 500 may alternatively extend proximal-to-distal. In some embodiments, grooves may extend neither laterally nor proximal 524 to distal 526, but at an intermediate, oblique angle. The wall 528 of the head 500 is formed so that the upper side 502 of the head 500 includes a series of upper peaks 532, with the grooves 512 extending between successive upper peaks 532. The lower side 504 is substantially flat and comprises a flat surface 534. The upper peaks 532 comprise parallel lines with substantially every point having the same elevation with respect to the longitudinal axis 536. Thus, a flat platform 538 is formed, and configured for lifting, holding, and flipping (turning) solid or semi-solid food items.

Figure 31:
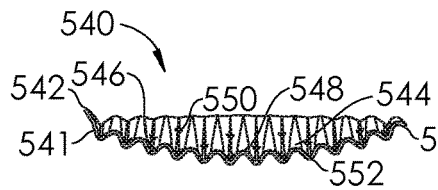
FIG. 31 is a cross-sectional view of the head of a kitchen utensil having a concave upper side having a sinusoidal surface, according to an embodiment of the present disclosure.

The head 542 of a kitchen utensil 540 is shown in FIG. 31, and includes a concave upper side 544 including a series of sinusoidal indentations 546 and projections 548 arrayed between first edge 541 and second edge 543. The sinusoidal indentations 546 comprise grooves or channels for collecting lipids as described herein. One or more holes 550 pass between the concave upper side 544 and a convex lower side 552. In embodiments where the sinusoidal indentations 546 and projections 548 each extend in a longitudinal (proximal to distal) direction, the first edge 541 and second edge 543 represent lateral edges. In embodiments where the sinusoidal indentations 546 and projections 548 each extend in a lateral (side to side) direction, the first edge 541 and second edge 543 represent front and back edges.

Figure 32:
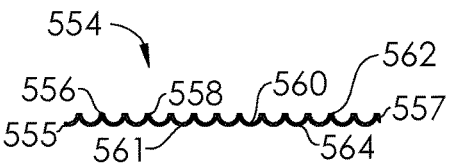
FIG. 32 is a cross-section view of the head of a kitchen utensil having a flat upper side having a repeating U-shaped surface contour, according to an embodiment of the present disclosure.

The head 556 of a kitchen utensil 554 is shown in FIG. 32, and includes a flat upper side 558 including a series of U-shaped indentations 560 which alternate between projections 562 and are arrayed between first edge 555 and second edge 557. The U-shaped indentations 560 comprise grooves or channels for collecting lipids as described herein. One or more holes 561 may be configured to pass between the flat upper side 558 and a flat lower side 564. In embodiments where the U-shaped indentations 560 and projections 562 each extend in a longitudinal (proximal to distal) direction, the first edge 555 and second edge 557 represent lateral edges. In embodiments where the U-shaped indentations 560 and projections 562 each extend in a lateral (side to side) direction, the first edge 555 and second edge 557 represent front and back edges.

Figure 33:
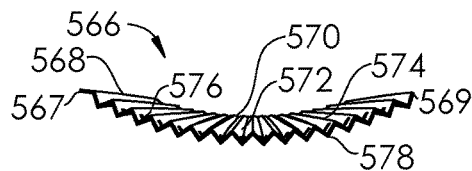
FIG. 33 is a cross-sectional view of the head of a kitchen utensil having a concave upper side having a repeating V-shaped surface contour, according to an embodiment of the present disclosure.

The head 568 of a kitchen utensil 566 is shown in FIG. 33, and includes a concave upper side 570 including a series of V-shaped indentations 572 and projections 574 which are arrayed between first edge 567 and second edge 569. The V-shaped indentations 572 comprise grooves or channels for collecting lipids as described herein. One or more holes 576 pass between the concave upper side 570 and a convex lower side 578. In embodiments where the V-shaped indentations 572 and projections 574 each extend in a longitudinal (proximal to distal) direction, the first edge 567 and second edge 569 represent lateral edges. In embodiments where the V-shaped indentations 572 and projections 574 each extend in a lateral (side to side) direction, the first edge 567 and second edge 569 represent front and back edges.

Figure 34:
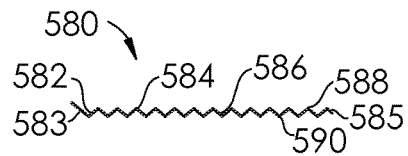
FIG. 34 is a cross-sectional view of the head of kitchen utensil having a flat upper side having a repeating V-shaped surface contour, according to an embodiment of the present disclosure.

The head 582 of a kitchen utensil 580 is shown in FIG. 34, and includes a flat upper side 584 including a series of V-shaped indentations 586 which alternate between projections 588 and are arrayed between first edge 583 and second edge 585. The V-shaped indentations 586 comprise grooves or channels for collecting lipids as described herein. One or more holes (not shown) may be configured to pass between the flat upper side 584 and a flat lower side 590. In embodiments where the V-shaped indentations 586 and projections 588 each extend in a longitudinal (proximal to distal) direction, the first edge 583 and second edge 585 represent lateral edges. In embodiments where the V-shaped indentations 586 and projections 588 each extend in a lateral (side to side) direction, the first edge 583 and second edge 585 represent front and back edges.

Figure 35:
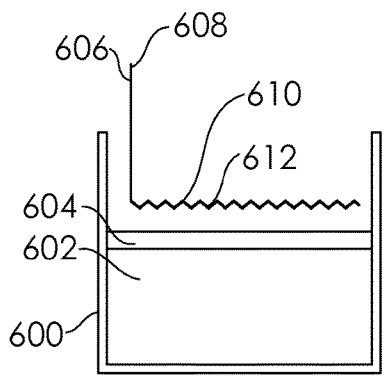
FIG. 35 is a cross-sectional view of the first step of a method for removal of lipids from a soup.
Figure 36A:
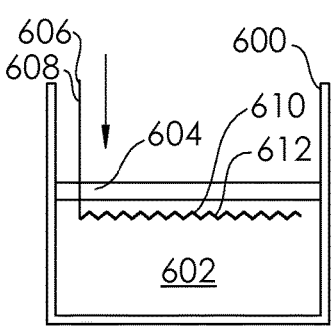
FIG. 36A is a cross-sectional view of the second step of a method for removal of lipids from a soup.
Figure 37:
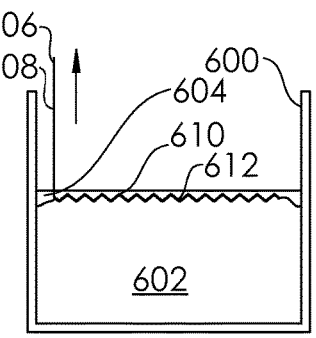
FIG. 37 is a cross-sectional view of the third step of a method for removal of lipids from a soup.
Figure 38:
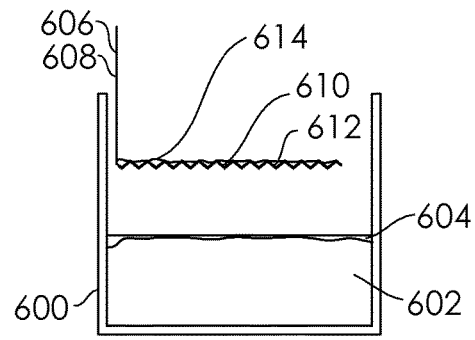
FIG. 38 is a cross-sectional view of the fourth step of a method for removal of lipids from a soup.

A container 600 is shown in FIGS. 35-38 filled with desired soup 602, and a layer of grease 604 or other unwanted materials, such as suds, floating on top of the soup 602. A kitchen utensil 606 in any of the mentioned embodiments is illustrated in use. In FIG. 35, a user grasps the handle 608 of the kitchen utensil 606 having a head 610 comprising a series of grooves or channels 612. In FIG. 36A, the user moves the head 610 below the layer of grease 604 in the general direction of the arrow. In FIG. 37, the user moves the head 610 in the general direction of the arrow (substantially upward) so that portions 614 of the grease 604 are forced into the grooves 612. In FIG. 38, the user lifts the entire head 610 above the soup 602 and whichever portion of the grease 604 remains floating on top of the soup 602. The grease 604 and unwanted floating materials retained within the grooves 612 is shown in FIG. 38.

Figure 36B:
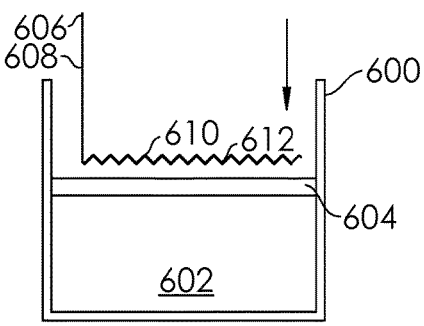
FIG. 36B is a cross-section view of an alternative second step of a method for removal of lipids from a soup.

The kitchen utensil 606 may also be utilized to pick up grease predominantly or completely via the adhesion of the lipid to the surface of the utensil. A user may contact the surface from the top, as illustrated in FIG. 36B without submerging the utensil below the surface of the liquid or food. The surface adhesion of the lipid to utensil will collect substantial volume of lipid without dripping away from the utensil despite the lower side of the utensil is subject to the force of gravity. Holes passing from the upper side to the lower side may or may not be incorporated to the head of the utensil 606. The lipid in the food need not be liquid or substantially liquid. For example, the utensil may be used to collect grease from solid food such as roasts and burgers.

The kitchen utensil 606 may be used by running or skimming the utensil over the surface of a cooking liquid. The kitchen utensil 606 is then placed in an orientation wherein the grooves are vertical, aligned with the direction of gravity. The gravitational force helps to the liquid grease, fat or oil together in the grooves 612, and the grooves 612 begin to fill with a larger and larger volume of the grease, fat or oil. As the grooves 612 become full, the combined mass overcomes the surface tension, and the grease, fat, or oil starts to flow longitudinally along the grooves 612.

Figure 39:
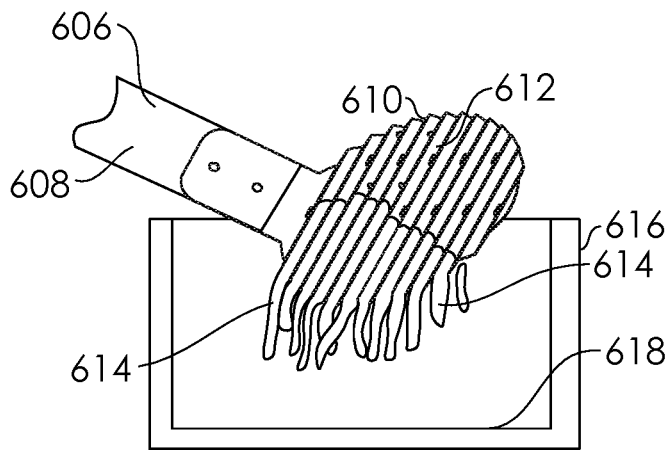
FIG. 39 is a perspective view of a fifth step of a method for removal of lipids from a soup.
Figure 40:
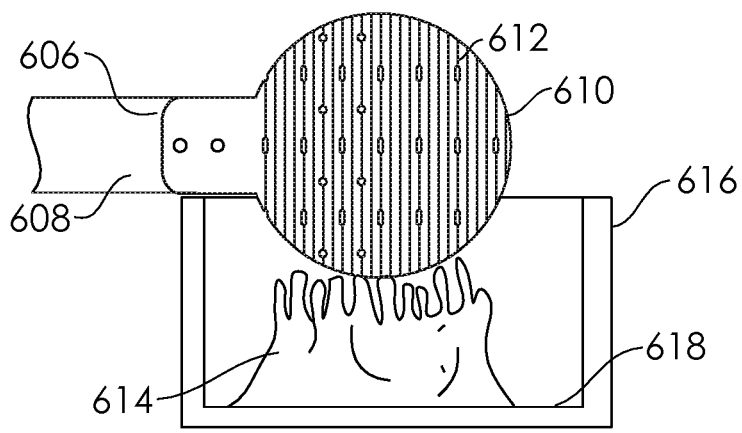
FIG. 40 is a perspective view of a first alternative fifth step of a method for removal of lipids from a soup.
Figure 41:
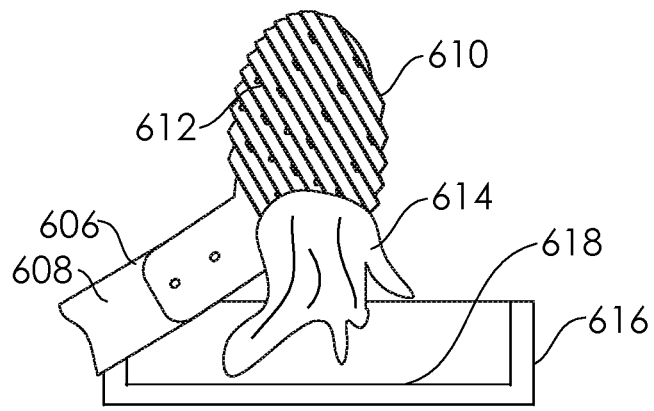
FIG. 41 is a perspective view of a second alternative fifth step of a method for removal of lipids from a soup.

In order to aid the release of the retained portions 614 of the grease 604 (and/or fat, or other lipids, foam) from the grooves 612 and into a waste or other receptacle 616, a user may manipulate the handle 608 to tip the head 610 of the kitchen utensil 606 as depicted in either of FIGS. 39, 40, and 41. In FIG. 39, the head 610 is tipped or slanted to about 45° from the horizontal. In FIG. 40, the head 610 is tipped or slanted to about 90° from the horizontal. In FIG. 41, the head 610 is tipped or slanted to about 120° from the horizontal. In these orientations, in combination with the groove feature, gravity aids in the release of the retained portions 614 of the grease (fat, other lipids) from the grooves 612 and downward into the bottom 618 of the receptacle 616. An impulsive motion of the kitchen utensil 606 along the longitudinal axes of the grooves 612 may be added in order to facilitate the release of the retained portions 614. Alternatively, an absorbent paper towel or cloth or other type of towel may be used to wipe the grease from the kitchen utensil 606.

A key feature of the embodiments described in the present disclosure takes advantage of the characteristics of grease and fat, particularly their relatively low surface tension. While grease adhesion to a utensil can occur whether the utensil of flat, grooved, or another shape, the grooves described in relation to the embodiments described herein allow the utensil to efficiently collect and dispose of fat and grease. The grooved portions of the utensils serve to increase the relative surface area over a portion of the head of the utensil, thus increasing the surface available to collect the lipid materials, and allowing them to pool within the grooves. However, the groove shape also allows for efficient disposal of the pooled lipid material. Certain prior art implements include extending bristles or other similar surface area increasing elements. However, the lipids tend to adhere to the bristles in these prior art devices, making them hard to remove and dispose of. The grease cannot be poured out of the bristles as easily as it can be poured out of the grooves in the embodiments of the present disclosure.

In the embodiments of the kitchen utensils presented in FIGS. 29, 30 a ladle or spatula containing grooves on a single side may be configured such that the ladle or spatula can be flipped over (inverted) and the bottom side, now facing up (or the top side, now facing down) may be used to separate and remove the lipids from the food item in this modified orientation. Furthermore, a feature may be added which is configured allow the rotation of the head relative to the handle. For example, the feature may include a swivel. The flat side or the convex that was facing down could now face up to utilize to manipulate food in that orientation. This may be helpful to pressing, forming or shaping food. Additionally, a grooved side that was facing up may be used in a manner described below in relation to FIG. 36B. A series of embodiments of spoons are now presented that include grooves on a bottom surface of the head of the spoon, such that the top concave surface is configured for scooping, serving, or stirring, while the bottom surface is configured for removing lipids or stirring.

Figure 42:
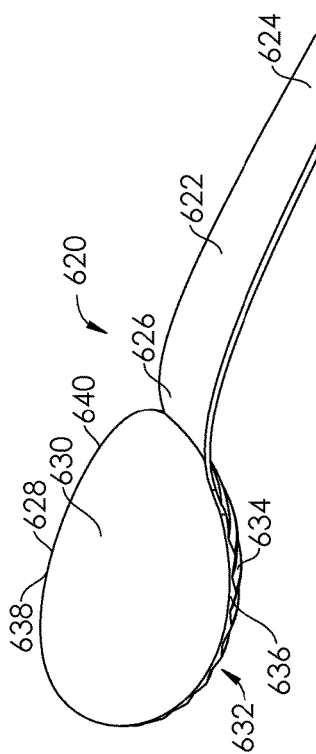
FIG. 42 is a perspective view of a kitchen utensil according to an embodiment of the disclosure.
Figure 43:
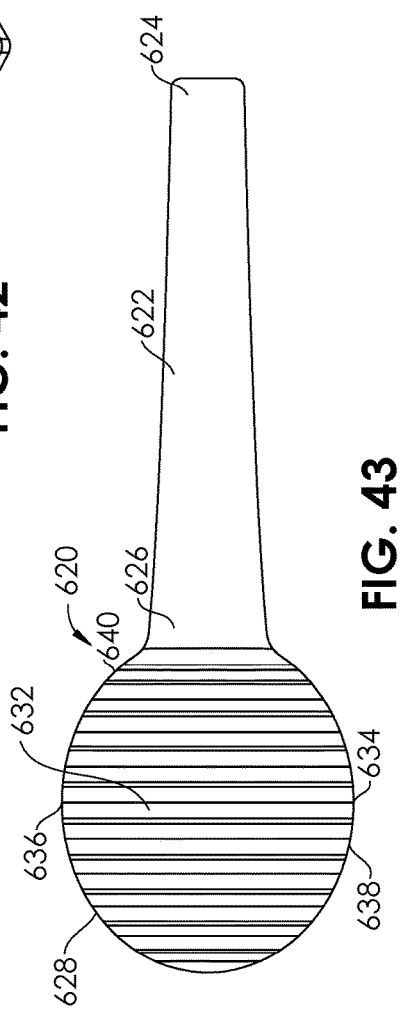
FIG. 43 is a bottom view of the kitchen utensil of FIG. 42.
Figure 44:
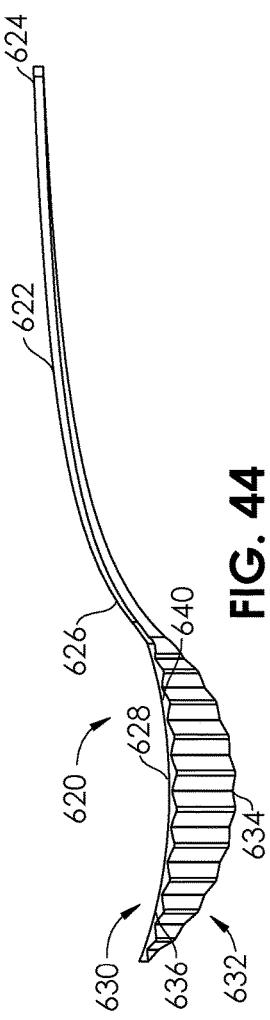
FIG. 44 is a side view of the kitchen utensil of FIG. 42.

A spoon 620 is shown in FIGS. 42-44 comprising a handle 622 having a proximal end 624 and a distal end 626 and a head 628 having a concave upper side 630 and a convex lower side 632. The head 628 and the handle 622 may be integral or monolithic and may be formed, cast, forged, 3D-printed, or molded from the same piece of material. Alternatively, the head 628 and the handle 622 may be separate components that are connected by any of the joining methods described herein. A series of grooves 634 extend along the convex lower side 632 from a first side 636 to a second side 638 of the head 628. The grooves 634 each extend from points on the outer perimeter 640 of the head 628. The grooves 634 are configured to collect lipids as described in relation to the grooves of the previous embodiments. The user removes the lipids from the food in accordance with the technique described in relation to FIG. 36B. The method of transferring the removed lipids out of the grooves 634 and into a receptacle 616 is similar to that described in relation to FIGS. 39-41.

Figure 45:
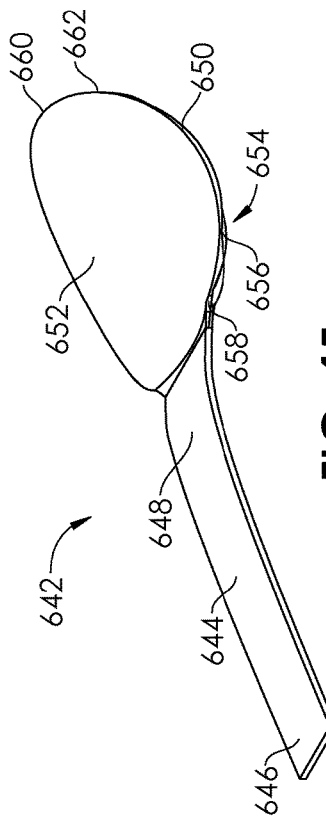
FIG. 45 is a perspective view of a kitchen utensil according to an embodiment of the disclosure.
Figure 46:
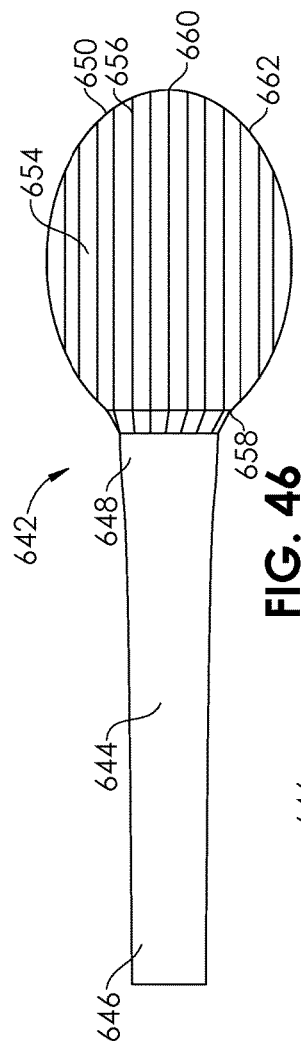
FIG. 46 is a bottom view of the kitchen utensil of FIG. 45.
Figure 47:
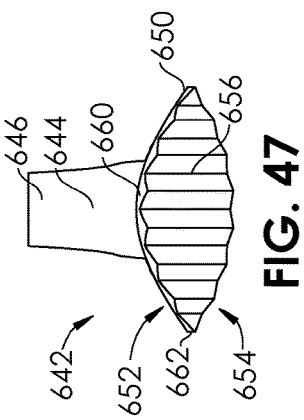
FIG. 47 is a front view of the kitchen utensil of FIG. 45.

A spoon 642 is shown in FIGS. 45-47 comprising a handle 644 having a proximal end 646 and a distal end 648 and a head 650 having a concave upper side 652 and a convex lower side 654. The head 650 and the handle 644 may be integral or monolithic and may be formed, cast, forged, 3D-printed, or molded from the same piece of material. Alternatively, the head 650 and the handle 644 may be separate components that are connected by any of the joining methods described herein. A series of grooves 656 extend along the convex lower side 654 from a proximal end 658 to a distal end 660 of the head 650. The grooves 656 each extend from points on the outer perimeter 662 of the head 650. The grooves 656 are configured to collect lipids as described in relation to the grooves of the previous embodiments. The user removes the lipids from the food in accordance with the technique described in relation to FIG. 36B. The method of transferring the removed lipids out of the grooves 656 and into a receptacle 616 is similar to that described in relation to FIGS. 39-41.

Figure 48:
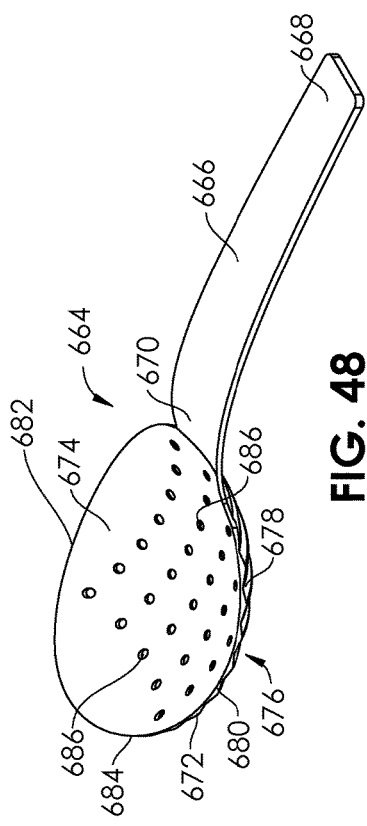
FIG. 48 is a perspective view of a kitchen utensil according to an embodiment of the disclosure.
Figure 49:
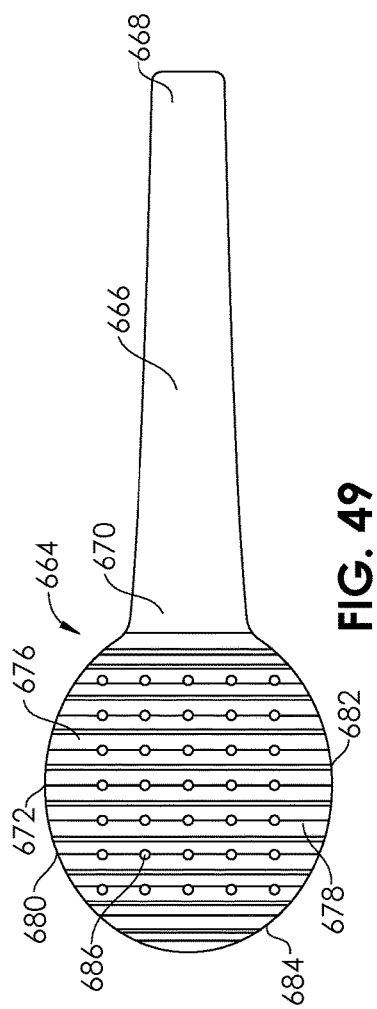
FIG. 49 is a bottom view of the kitchen utensil of FIG. 48.
Figure 50:
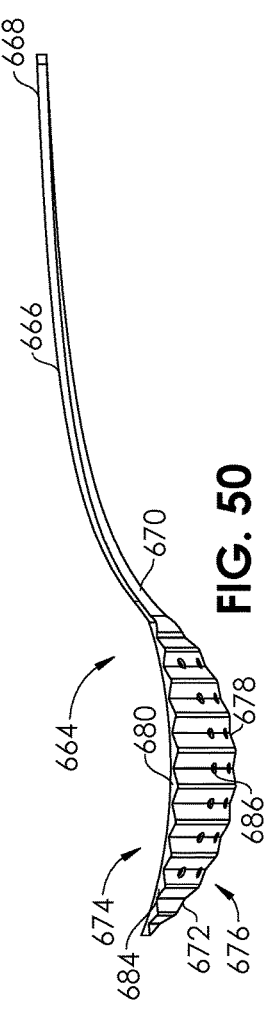
FIG. 50 is a side view of the kitchen utensil of FIG. 48.

A spoon 664 is shown in FIGS. 48-50 comprising a handle 666 having a proximal end 668 and a distal end 670 and a head 672 having a concave upper side 674 and a convex lower side 676. The head 672 and the handle 666 may be integral or monolithic and may be formed, cast, forged, 3D-printed, or molded from the same piece of material. Alternatively, the head 672 and the handle 666 may be separate components that are connected by any of the joining methods described herein. A series of grooves 678 extend along the convex lower side 676 from a first side 680 to a second side 682 of the head 672. The grooves 678 each extend from points on the outer perimeter 684 of the head 672. The grooves 678 are configured to collect lipids as described in relation to the grooves of the previous embodiments. The user removes the lipids from the food in accordance with the technique described in relation to FIG. 36B. The method of transferring the removed lipids out of the grooves 678 and into a receptacle 616 is similar to that described in relation to FIGS. 39-41. A series of holes 686 passing between the concave upper side 674 and the convex lower side 676 of the head 672 are configured to allow the passage of aqueous liquids therethrough.

Figure 51:
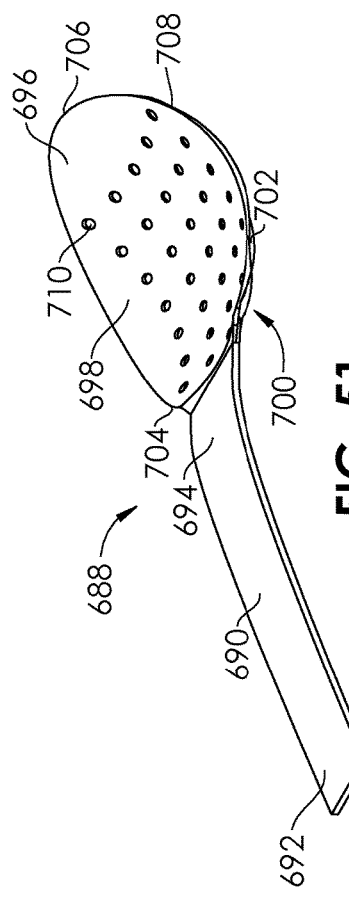
FIG. 51 is a perspective view of a kitchen utensil according to an embodiment of the disclosure.
Figure 52:
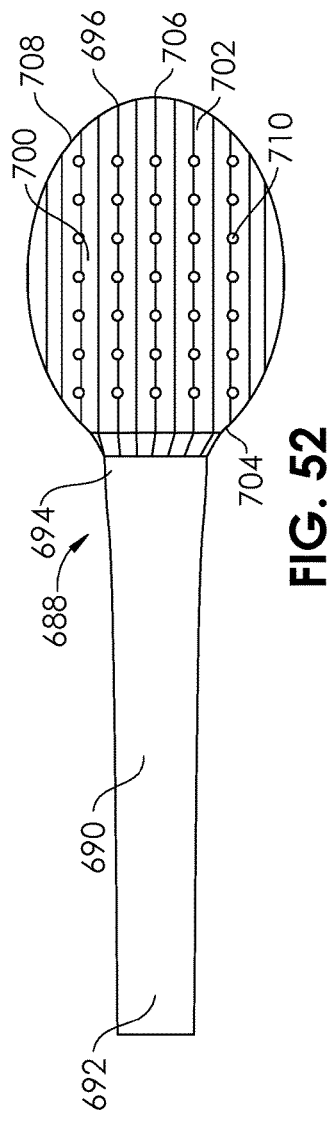
FIG. 52 is a bottom view of the kitchen utensil of FIG. 51.
Figure 53:
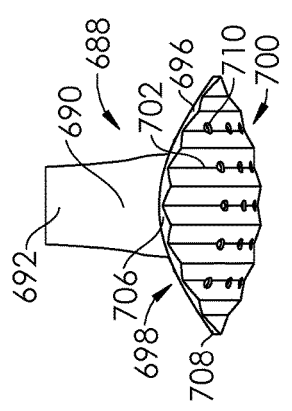
FIG. 53 is a front view of the kitchen utensil of FIG. 51.

A spoon 688 is shown in FIGS. 51-53 comprising a handle 690 having a proximal end 692 and a distal end 694 and a head 696 having a concave upper side 698 and a convex lower side 700. The head 696 and the handle 690 may be integral or monolithic and may be formed, cast, forged, 3D-printed, or molded from the same piece of material. Alternatively, the head 696 and the handle 690 may be separate components that are connected by any of the joining methods described herein. A series of grooves 702 extend along the convex lower side 700 from a proximal end 704 to a distal end 706 of the head 696. The grooves 702 each extend from points on the outer perimeter 708 of the head 696. The grooves 702 are configured to collect lipids as described in relation to the grooves of the previous embodiments. The user removes the lipids from the food in accordance with the technique described in relation to FIG. 36B. The method of transferring the removed lipids out of the grooves 702 and into a receptacle 616 is similar to that described in relation to FIGS. 39-41. A series of holes 710 passing between the concave upper side 698 and the convex lower side 700 of the head 696 are configured to allow the passage of aqueous liquids therethrough.

A spoon 710 is shown in FIGS. 54-56 comprising a handle 712 having a proximal end 714 and a distal end 716 and a head 718 having a concave upper side 720 and a convex lower side 722. The head 718 and the handle 712 may be integral or monolithic and may be formed, cast, forged, 3D-printed, or molded from the same piece of material. Alternatively, the head 718 and the handle 712 may be separate components that are connected by any of the joining methods described herein. A series of grooves 724 extend along the convex lower side 722 from a first side 726 to a second side 728 of the head 718. The grooves 724 each extend from points on the outer perimeter 730 of the head 718. The grooves 724 are configured to collect lipids as described in relation to the grooves of the previous embodiments. The user removes the lipids from the food in accordance with the technique described in relation to FIG. 36B. The method of transferring the removed lipids out of the grooves 724 and into a receptacle 616 is similar to that described in relation to FIGS. 39-41. A series of holes 732 passing between the concave upper side 720 and the convex lower side 722 of the head 718 are configured to allow the passage of aqueous liquids therethrough. A majority of the holes 732 are located on a first portion 734 of the head 718 not containing the grooves 724. The first portion 734 is located towards the proximal end 736 of the head 718, but in alternative embodiments, may be located towards the distal end 738 of the head 718. A majority of the grooves 724 are located on a second portion 740 of the head 718 not containing the holes 732. The second portion 740 is located towards the distal end 738 of the head 718, but in alternative embodiments, may be located towards the proximal end 736 of the head 718.

Figure 57:
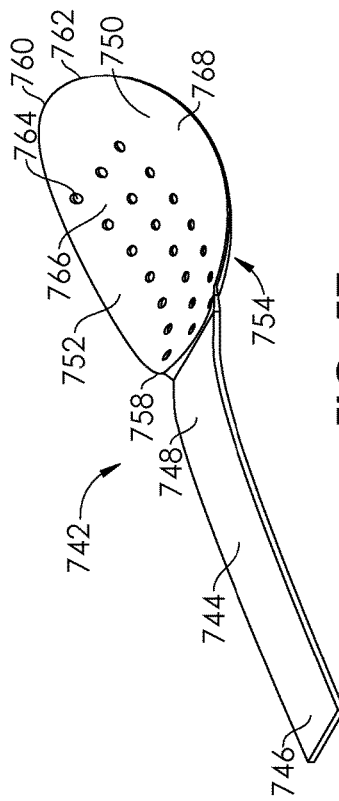
FIG. 57 is a perspective view of a kitchen utensil according to an embodiment of the disclosure.
Figure 58:
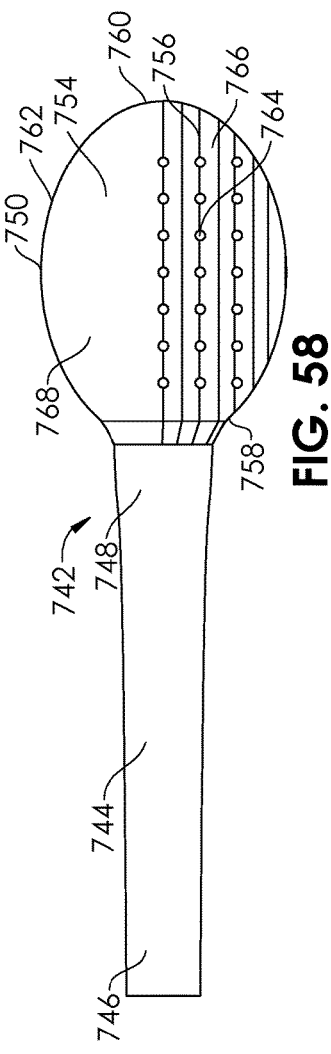
FIG. 58 is a bottom view of the kitchen utensil of FIG. 57.
Figure 59:
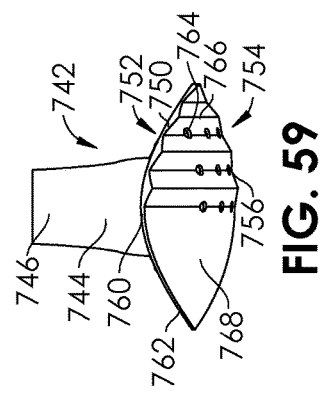
FIG. 59 is a front view of the kitchen utensil of FIG. 57.

A spoon 742 is shown in FIGS. 57-59 comprising a handle 744 having a proximal end 746 and a distal end 748 and a head 750 having a concave upper side 752 and a convex lower side 754. The head 750 and the handle 744 may be integral or monolithic and may be formed, cast, forged, 3D-printed, or molded from the same piece of material. Alternatively, the head 750 and the handle 744 may be separate components that are connected by any of the joining methods described herein. A series of grooves 756 extend along the convex lower side 754 from a proximal end 758 to a distal end 760 of the head 750. The grooves 756 each extend from points on the outer perimeter 762 of the head 750. The grooves 756 are configured to collect lipids as described in relation to the grooves of the previous embodiments. The user removes the lipids from the food in accordance with the technique described in relation to FIG. 36B. The method of transferring the removed lipids out of the grooves 756 and into a receptacle 616 is similar to that described in relation to FIGS. 39-41. A series of holes 764 passing between the concave upper side 752 and the convex lower side 754 of the head 750 are configured to allow the passage of aqueous liquids therethrough. A majority of the holes 764 are located on a first portion 766 of the head 750. A majority of the grooves 756 are also located on the first portion 766 of the head 750. The second portion 768 of the head 750 is free of holes 764 and grooves 756. Though the first portion 766 and the second portion 768 are shown substantially side-by-side, on alternative embodiments, the first portion 766 and second portion 768 may be arranged in other relative spacings, such as proximal and distal, distal and proximal, a central area and a surrounding peripheral area (ring), or vice versa.

Figure 60:
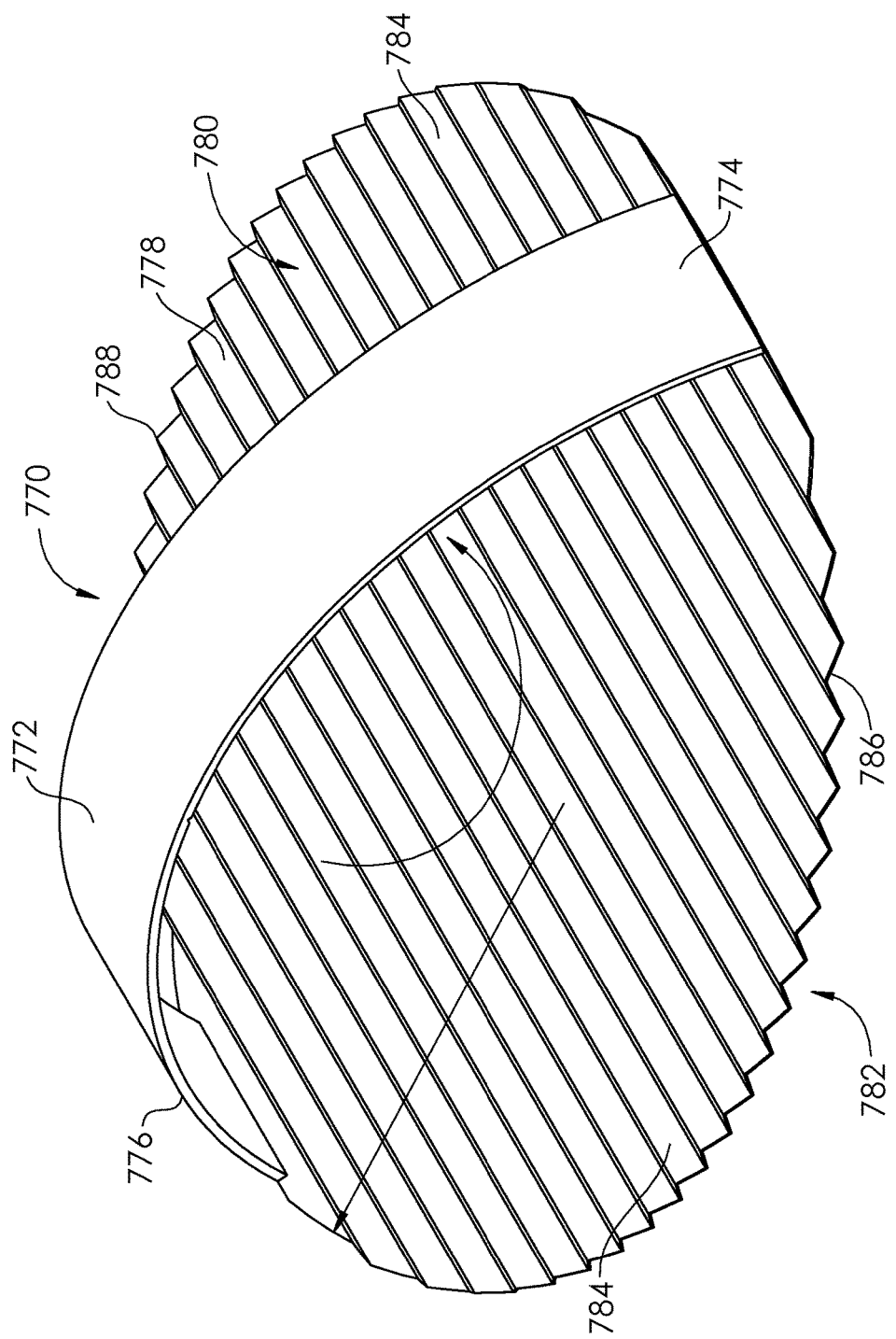
FIG. 60 is a perspective view of a kitchen utensil according to an embodiment of the present disclosure.

A kitchen utensil 770 is shown in FIG. 60 comprising a handle 772 having a first end 774 and a second end 776, and a head 778 having a top side 780 and a bottom side 782. The handle is configured for gripping by a user between the first end 774 and the second end 776. The first end 774 and second end 776 are each coupled to the head 778 and may be integral or monolithic and may be formed, cast, forged, 3D-printed, or molded from the same piece of material. Alternatively, the first end 774 and second end 776 of the handle 772 and the head 778 may be separate components that are connected by any of the joining methods described herein. A first series of grooves 784 are carried on the top side 780, and a second series of grooves 786 are carried on the bottom side 782. The grooves 784 and the grooves 786 extend inwardly from an outer perimeter 788. The kitchen utensil 770 is configured to be used as a skimmer to remove grease, fat, or other lipids from food. For example, a user may grasp the handle 772 and lower the head 778 into a soup, below a top layer of lipids, and then lift the head 778 out of the soup, capturing the lipids in the grooves 784. The method of transferring the removed lipids out of the grooves 784 and into a receptacle 616 is similar to that described in relation to FIGS. 39-41. The kitchen utensil 770 may alternately be used as a lid, for example, or a smaller pot or pan than the soup pot. In other uses, the kitchen utensil 770 may be used as a scraper to trap grease or fat from a solid food item such as a steak or hamburger, by placing the head 778 over the food item and forcing the grooves 786 into grease or fat on top of the solid food item. The grease or fat may then be scraped off of the solid food item by grasping the handle 772 and sliding the head 778 in a direction transverse to the longitudinal axes of the grooves 786 (arrow), or by rotating the head 778 (curved arrow). Many lipids will adhere to the wall of the grooves 786, allowing the lipids to be removed with the head 778.

A kitchen utensil 790 is shown in FIG. 61 comprising a handle 792 having a proximal end 794 and a distal end 796 and a spherical head 798 coupled to the distal end 796 of the handle 792. The handle 792 may be integral or monolithic with the head 798 and may be formed, cast, forged, 3D-printed, or molded from the same piece of material. Alternatively, the handle 792 and he head 798 may be separate components that are connected by any of the joining methods described herein. A series of circumferentially extending grooves 800 encircle the head 798. Each groove 800 begins at a first point 802 on the outer circumference 804 of a portion of the head 798, extends 360° around the head 798 and returns to the first point 802. An outer circumference 804a at a distal end 806 of the head 798 is smaller than an outer circumference 804b at a central region 808 of the head 798. The kitchen utensil 790 includes a hollow central cavity 810. The grooves 800 are configured to separate or remove lipids from liquid, semi-solid, or solid food. A user grasps the handle 792 and moves the head 798 into or against the food containing the lipid, it order to allow the lipid to adhere to the grooves 800. The head 798 is then removed from the food item and the lipids are removed from the grooves 800 my shaking or wiping. The kitchen utensil 790 may in some embodiments also be used as a pestle, for breaking, grinding, or otherwise modifying food items within a mortar or other container. In other embodiments, the kitchen utensil 790 may also serve as a honey dipper, for dispensing honey using the grooves 800 of the head 798. The kitchen utensil 790 may be configured to be rammed into food (along a longitudinal axis) by a user, or to be rotated (about a longitudinal axis) by the user.

A kitchen utensil 812 is shown in FIG. 62 comprising a handle 814 having a proximal end 816 and a distal end 818 and a spherical head 820 having a hollow central cavity 822. The kitchen utensil 812 is similar in structure and use to the kitchen utensil 790 of FIG. 61, except that it includes a longitudinally-extending channel 824 starting at an outer perimeter 826 of the head 820 and extending inward, toward the longitudinal axis 828. As shown in FIG. 62, the channel 824 extends all the way to the central cavity 822, but in other embodiments, the channel may extend only partially. A series of grooves 830 extend from a first side 832 of the channel 824 at the outer perimeter 826, around the spherical head 820 and longitudinal axis, and ending at a second side 834 of the channel 824 at the outer perimeter 826. In other embodiments, two or more longitudinally-extending channels 824 may be formed on the head 820. Thus, the grooves 830 may extend only partially around the head 820, or may extend almost entirely around the head. The extension of a single groove 830 may vary from between about 45° to about 358°, or between about 90° and about 355°, or between about 150° and about 355°.

A kitchen utensil 836 is shown in FIG. 63 comprising a handle 838 having a proximal end 840 and a distal end 842 and a conical head 844 having a series of circumferentially-extending grooves 846. Though the handle 838 may be grasped by the hand of a user, it has a hexagonal surface 848 configured to be coupled to hand-driven or motorized rotating device (not shown). In some embodiments, the hexagonal surface 848 is replaced by another non-round shape, such as square. The grooves 846 extending circumferentially around the head 844 are configured for separating and removing lipids from food. The head 844 may, in some embodiments, also be used as a mixing head to agitate, stir, mix, whip, and otherwise modify liquid mixtures or liquid-solid mixtures.

The kitchen utensil 850 of FIG. 64 comprises a handle 852 having a proximal end 854 and a distal end 856 and a conical head 858. The kitchen utensil 850 is similar to the kitchen utensil 836 of FIG. 63, except that the grooves 860 extend partially around the head 858 between longitudinally-extending channels 862. For example, groove 860a extends around the outer perimeter 855, between a first point 857 and a second point 859. The handle 852 includes an inner hexagonal cavity 864, configured to be engaged with a hex key or a hexagonal drive element of a manual or automatic driver.

Figure 65:
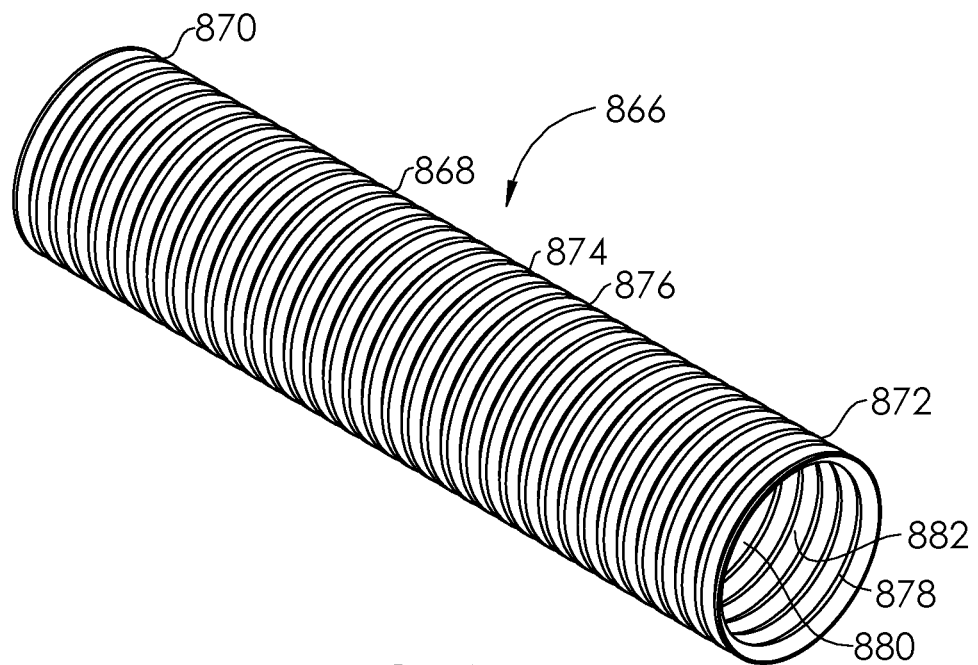
FIG. 65 is a perspective view of a kitchen utensil according to an embodiment of the present disclosure.

A kitchen utensil 866 is shown in FIG. 65 comprising a hollow elongate body 868 having a first end 870 and a second end 872. One of the first end 870 or second end 872 may be grasped by a user, thus serving as a handle. The non-grasped portion of the kitchen utensil 866 may thus be used for removing lipids from food. The kitchen utensil 866 may also be used to stir liquid or semi-liquid broths or mixtures. A lumen 880 extends the entire length of the elongate body 868 and may be used to siphon or inject liquids or liquid-solid mixtures. A first series of grooves 874 extend around an exterior 876 of the elongate body 868 and a second series of grooves 878 extend around an interior surface 882 of the elongate body. To remove lipids from a food item, the user inserts some or all of a non-gripped portion of the elongate body 868 into the food item to capture lipids within the grooves 874, 878. The kitchen utensil 866 may then be removed from the food item in order to remove the lipids from the grooves 874, 878.

Figure 66:
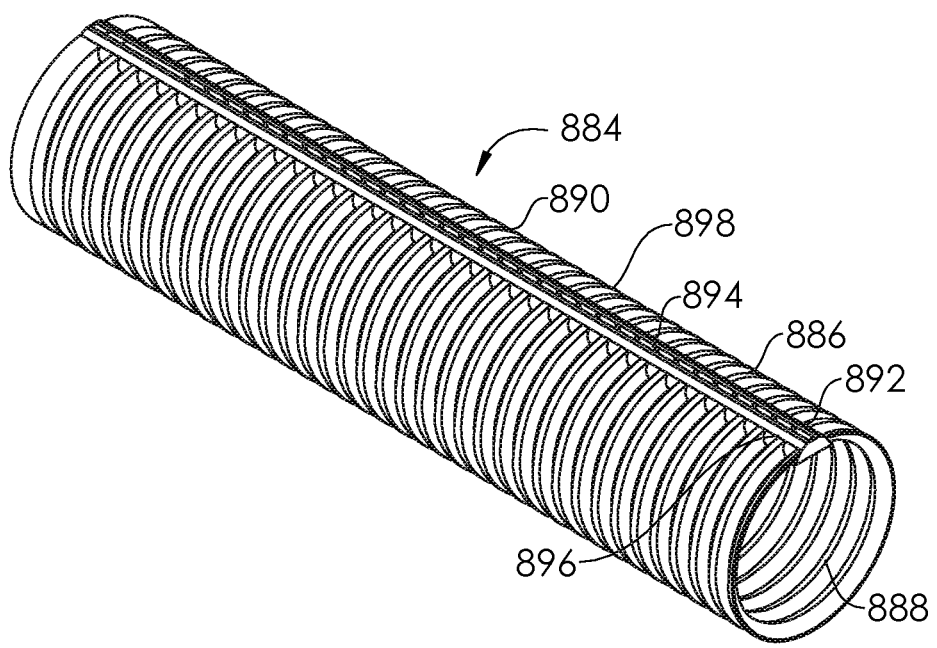
FIG. 66 is a perspective view of a kitchen utensil according to an embodiment of the present disclosure.

The kitchen utensil 884 of FIG. 66 is similar to the kitchen utensil 866 of FIG. 65, except the external grooves 886 and the internal grooves 888 do not extend all the way circumferentially around the elongate body 890. The grooves 886, 888 extend from a first side 892 of a longitudinal slit 894, around the outer perimeter 898 elongate body 890, and terminating at a second side 896 of the longitudinal slit 894.

A kitchen utensil 900 is shown in FIGS. 67-69 comprising a handle 902 having a proximal end 904 and a distal end 906 and a head 908. The head 908 includes an upper smooth side 910 which is depicted in a concave form, but which may alternatively be other shapes. The upper smooth side 910 is adjacent an abutment 911, and may be used to scoop or spread food materials. A bottom side 912 includes several rows of repeating projections 914 which together form a series of broken (e.g., dotted line) walls which thus define a series of grooves 916. The projections 914 may be used to scrape lipids and unwanted materials from food, and the grooves 916 are configured to maintain the lipid material, as described in accordance with the other embodiments herein. In between each successive projection 914 is a space 917. When the projections 914 are substantially the same with and are substantially aligned (as shown), a channel 919 transverse to the grooves 916 is defined. In other embodiments, the projections 914 may comprise rails, bumps, or inverted dimples.

Figure 70:
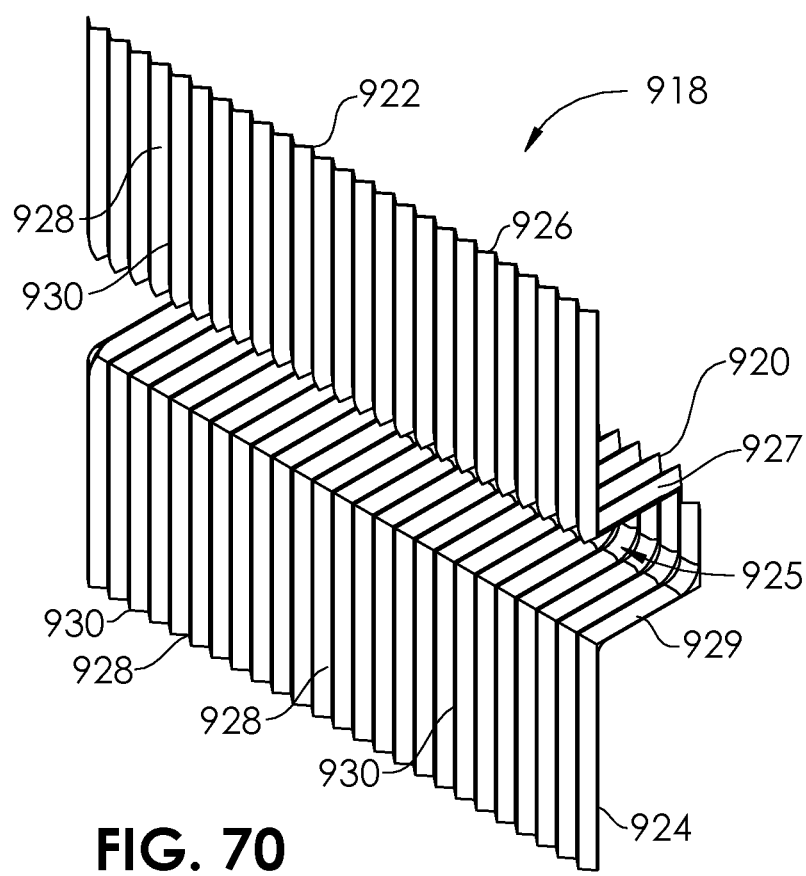
FIG. 70 is a perspective view of a kitchen utensil according to an embodiment of the present disclosure.

A scraper 918, shown in FIG. 70, is configured to scrape material from food or from a cooking surface or other surface. A handle 920 comprises a central arced projection and continues laterally to two wings 922, 924. The scraper 918 may be simply made from a single extrusion or a formed piece of metal having a sinusoidal or repeating wave cross-section 926. Peaks 930 on the underside of the wings 922, 924 are configured to scrape lipids or other burnt or otherwise undesired material. Grooves 928 on the underside of the wings 922, 924 are configured to receive and maintain lipids or other burnt or otherwise undesired material. A central space 925 is shown between the two wings 922, 924, but is not required. In other embodiments, a first side 927 and a second side 929 of the handle 920 may be flush or directly adjacent to each other, within the space 925.

Figure 71:
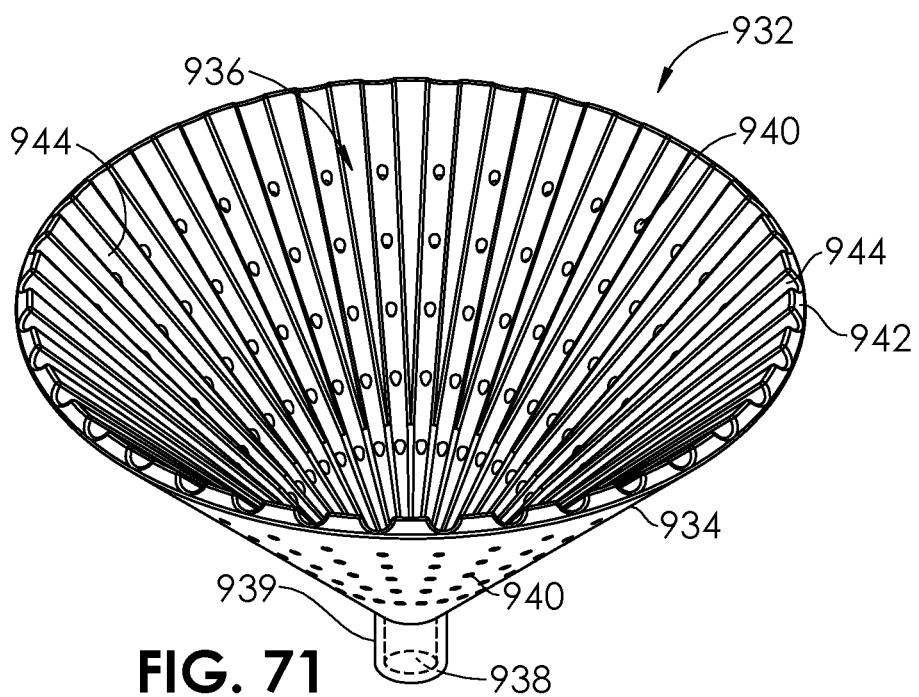
FIG. 71 is a perspective view of a kitchen utensil according to an embodiment of the present disclosure.
Figure 72A:
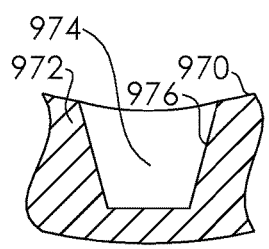
FIGS. 72A-H are cross-sectional views of groove shapes according to embodiments of the present disclosure.
Figure 72B:
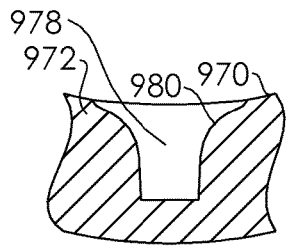
Figure 72C:
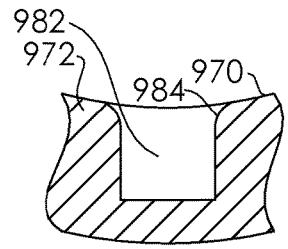
Figure 72D:
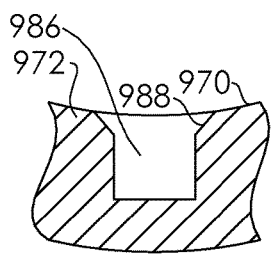
Figure 72E:
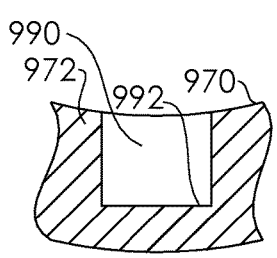
Figure 72F:
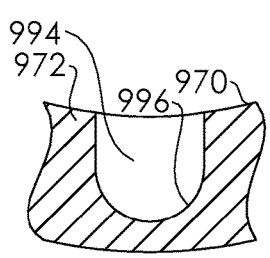
Figure 72G:
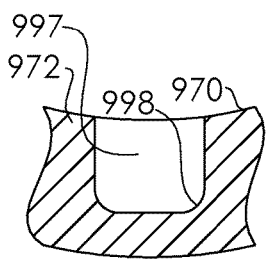
Figure 72H:
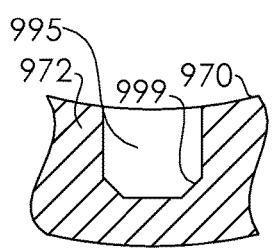

A funnel 932, shown in FIG. 71, includes a conical body 934 having a trough 936 or inlet, and an exit hole 938 within a projection 939. The conical body 934 may include a series of holes 940 in its wall 942. The wall 942 further comprises a series of grooves 944 configured to receive and maintain lipids, as described in accordance with the other embodiments herein.

The grooves described in the embodiments herein that are configured for receiving lipids may each have a width of between about 0.5 mm and about 20 mm, or between about 1 mm and about 15 mm, or between about 2 mm and about 10 mm. The grooves described in the embodiments herein that are configured for receiving lipids may each have a depth of between about 0.5 mm and about 15 mm, or between about 1 mm and about 12 mm, or between about 2 mm and about 10 mm. The grooves may have a square cross-section at the bottom of their depth, or may have a radiused bottom. The groove patterns may include symmetric or asymmetric patterns and may be straight, curvilinear, sinusoidal, continuous, segmented, or tapering. Either or both groove width and groove depth may taper or vary in dimension along the groove.

FIGS. 72A-72H illustrate cross-section shapes of groove extending within the wall 972 of a head 970 of a kitchen utensil. Any combination of the shapes described may be incorporated in the embodiments of kitchen utensils described herein. A groove 974 in FIG. 72A includes two tapered side walls 976. A groove 978 in FIG. 72B includes a flared entrance 980. A groove 982 in FIG. 72C includes a fileted entrance 984. A groove 986 in FIG. 72D includes a chamfered entrance 988. A groove 990 in FIG. 72E includes a flat bottom 992. A groove 994 in FIG. 72F includes a full radiused bottom 996. A groove 997 in FIG. 72G includes a filleted bottom 998. A groove 995 in FIG. 72H includes a chamfered bottom 999.

In additional embodiments, a groove wiper may be provided, either as a sliding element of the kitchen utensil, or as a separate element. The groove wiper may have a shape that matches the contours of the grooves. The groove wiper may comprise a rubber and may have a thin projection, similar to that of a squeegee blade. In other embodiments, the wiper may be rigid, and may sweep in an arc, similar to the wiper in certain ice cream scoopers.

While embodiments have been shown and described, various modifications may be made without departing from the scope of the inventive concepts disclosed herein.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A kitchen utensil for removing lipids from food comprising:
   a handle having a first end, a second end, and a gripping region between the first end and the second end;
   a head extending from the second end of the handle, the head having first side, a second side, and an outer perimeter; and
   wherein the first side includes at least one groove extending inwardly from a first groove end located at the outer perimeter, the at least one groove configured to collect a lipid material therein, wherein the at least one groove comprises two or more grooves, each groove extending from a different groove end located at the outer perimeter, and wherein each of the two or more grooves extends between a groove end located on a first point along the outer perimeter and a groove end located on a second point along the outer perimeter.

2. A kitchen utensil for removing lipids from food comprising:
   a handle having a first end, a second end, and a gripping region between the first end and the second end;
   a head extending from the second end of the handle, the head having first side, a second side, and an outer perimeter; and
   wherein the first side includes at least one groove extending inwardly from a first groove end located at the outer perimeter, the at least one groove configured to collect a lipid material therein, and wherein the second side includes at least one groove extending inwardly from a first groove end located at the outer perimeter, the at least one groove configured to collect a lipid material therein.

* * * * *